(12) United States Patent
Abe et al.

(10) Patent No.: US 7,965,491 B2
(45) Date of Patent: Jun. 21, 2011

(54) VARIABLE CAPACITOR, RESONATOR AND MODULATOR

(75) Inventors: Yoshikazu Abe, Miyagi (JP); Takashi Watanabe, Miyagi (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 12/431,752

(22) Filed: Apr. 28, 2009

(65) Prior Publication Data

US 2009/0268367 A1    Oct. 29, 2009

Related U.S. Application Data

(63) Continuation of application No. PCT/JP2007/070207, filed on Oct. 16, 2007.

(30) Foreign Application Priority Data

Oct. 31, 2006  (JP) .................................. 2006-297100

(51) Int. Cl.
*H01G 5/16*  (2006.01)
(52) U.S. Cl. ........................................ 361/290; 361/281
(58) Field of Classification Search .................. 361/290, 361/281
See application file for complete search history.

(56) References Cited

U.S. PATENT DOCUMENTS

| | | |
|---|---|---|
| 2003/0179535 A1 | 9/2003 | Shimanouchi et al. |
| 2004/0075158 A1 | 4/2004 | Nakayama |
| 2005/0180089 A1 | 8/2005 | Nakayama |
| 2005/0190526 A1 | 9/2005 | Nakayama |
| 2005/0254195 A1 | 11/2005 | Nakayama |
| 2006/0292729 A1* | 12/2006 | Ohguro ........................... 438/48 |
| 2007/0025050 A1* | 2/2007 | Shimanouchi et al. ....... 361/277 |
| 2008/0007888 A1* | 1/2008 | Morris et al. .................. 361/281 |

FOREIGN PATENT DOCUMENTS

| | | |
|---|---|---|
| JP | 2003-124063 A | 4/2003 |
| JP | 2004-006588 A | 1/2004 |
| JP | 2004-127973 A | 4/2004 |
| JP | 2004-172504 A | 6/2004 |
| JP | 2006-165380 A | 6/2006 |

OTHER PUBLICATIONS

International Search Report (ISR) for PCT/JP2007/070207 (the parent application of this continuation application).

* cited by examiner

*Primary Examiner* — Joseph Chang
(74) *Attorney, Agent, or Firm* — Chen Yoshimura LLP

(57) ABSTRACT

Provided is a variable capacitance element comprising a plurality of single capacitance elements that each include (i) a fixed electrode provided on a surface of a substrate, (ii) a floating electrode provided to be separate from the fixed electrode and facing the fixed electrode, and (iii) an actuator that moves the floating electrode closer to or farther from the fixed electrode; and a floating electrode driving section that supplies the actuators with drive power to move the floating electrodes, such that a combined capacitance of the plurality of single capacitance elements becomes a prescribed capacitance.

17 Claims, 23 Drawing Sheets

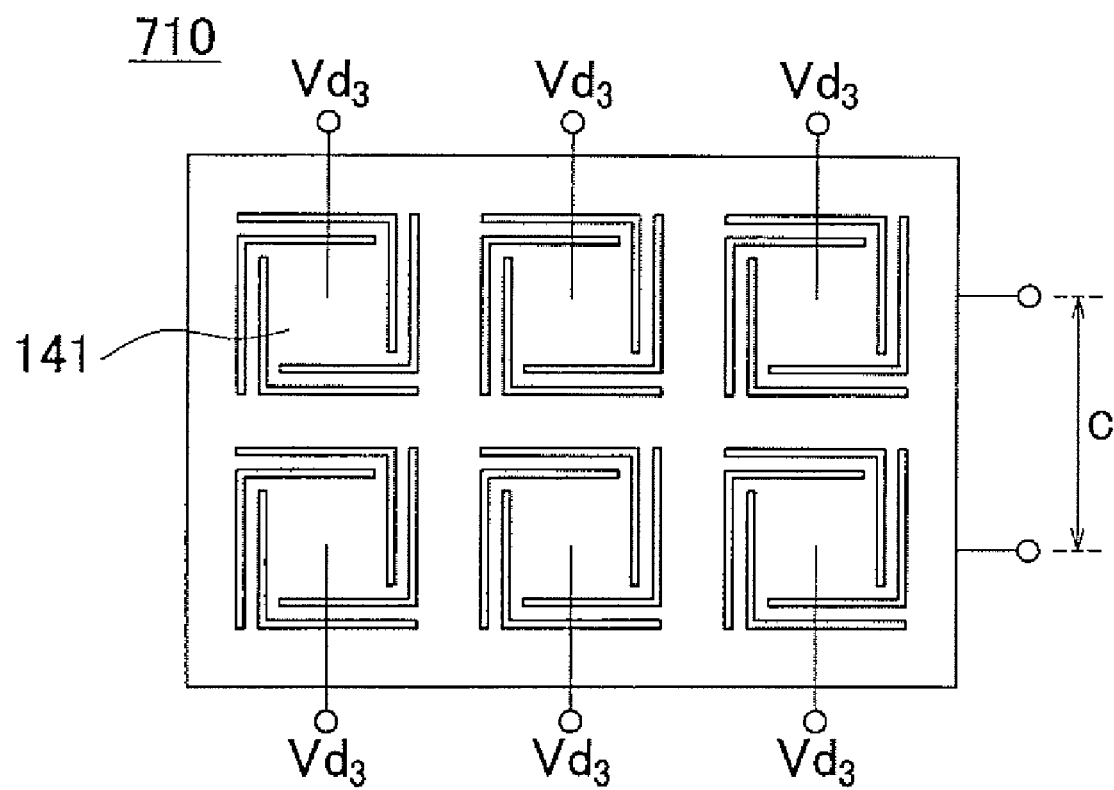
F I G . 13

VARIABLE CAPACITOR, RESONATOR AND MODULATOR

CROSS REFERENCE TO RELATED APPLICATION

This is a continuation application of PCT/JP2007/070207 filed on Oct. 16, 2007 which claims priority from a Japanese Patent Application No. 2006-297100 filed on Oct. 31, 2006, the contents of which are incorporated herein by reference.

BACKGROUND

1. Technical Field

The present invention relates to a variable capacitance element, a resonator, and a modulator. In particular, the present invention relates to a variable capacitance element, a resonator, and a modulator using MEMS (Micro Electro Mechanical System) technology.

2. Related Art

A variable capacitance element uses many electrical circuits such as a VFO (Variable Frequency Oscillator), a tuned amplifier, a phase shifter, and an impedance matching circuit. In recent years, variable capacitance elements are being increasingly used in portable devices, which creates a particular need for miniaturization and cost decrease. Use of variable capacitance elements at high frequency bands is also increasing. Variable capacitance elements manufactured using MEMS technology are expected to have less loss and a higher Q value than varactor diodes, which are widely used at present.

Japanese Patent Application Publication No. 2004-172504 discloses a variable capacitor manufactured using MEMS technology and having an electrostatic actuator. This variable capacitor is provided with fixed capacitor electrodes and fixed actuator electrodes formed on a substrate, and with mobile actuator electrodes and mobile capacitor electrodes supported elastically on the fixed electrodes. The mobile actuator electrodes and mobile capacitor electrodes are formed integrally, and when the mobile actuator electrodes are moved by the electrostatic force between the fixed actuator electrodes and mobile actuator electrodes, the mobile capacitor electrodes are also moved. Accordingly, the intervals between the mobile capacitor electrodes and the fixed capacitor electrodes change, so that the capacitance also changes.

Japanese Patent Application Publication No. 2004-127973 discloses a variable capacitor manufactured using MEMS technology and having actuators that use piezoelectric materials. This variable capacitor is provided with a pair of mobile electrodes that both have actuators, and the capacitance is changed by bringing these electrodes close together or moving them further apart to change the space therebetween.

The above variable capacitor disclosed in Japanese Patent Application Publication No. 2004-172504 uses electrostatic actuators. In order for the electrostatic actuators to operate effectively, the actuator electrodes must have sufficient surface area. Therefore, the overall area of the variable capacitor including these electrodes is large. Furthermore, the electrostatic actuator has a drive force that changes greatly depending on the distance between the electrodes, and so it is difficult for the mobile electrodes to find a stroke. Yet further, a relatively high voltage around 10 V is desired for driving the electrostatic actuator, and so it is difficult to use this actuator in a circuit having a battery as a power source.

The above variable capacitor disclosed in Japanese Patent Application Publication No. 2004-127973 has piezoelectric actuators, and can therefore be driven by a relatively low voltage. This variable capacitor also has a faster response than the capacitor having electrostatic actuators. However, in this variable capacitor, the dimensions of the mobile electrodes increase relative to the size of the capacitance. Therefore, the mass of the mobile electrodes, which are being moved by the actuator, increases, thereby slowing down the operation. The only way to maintain the same response speed is to increase the size of the actuators.

SUMMARY

Therefore, it is an object of an aspect of the innovations herein to provide a variable capacitance element, a resonator, and a modulator, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary variable capacitance element may comprise a plurality of single capacitance elements that each include (i) a fixed electrode provided on a surface of a substrate, (ii) a floating electrode provided to be separate from the fixed electrode and facing the fixed electrode, and (iii) an actuator that moves the floating electrode closer to or farther from the fixed electrode; and a floating electrode driving section that supplies the actuators with drive power to move the floating electrodes, such that a combined capacitance of the plurality of single capacitance elements becomes a prescribed capacitance.

According to a second aspect related to the innovations herein, one exemplary resonator may comprise the variable capacitance element according to claim 1; an inductance element that is electrically connected to the variable capacitance element to form a resonant circuit; and a resonance control section that controls the floating electrode driving section such that the combined capacitance of the plurality of single capacitance elements becomes a capacitance that causes the resonant circuit to resonate at a desired resonance frequency.

According to a third aspect related to the innovations herein, one exemplary modulator may comprise the variable capacitance element according to claim 1; an inductance element that is electrically connected to the capacitance element to form an oscillation circuit; a carrier wave control section that controls the floating electrode driving section such that at least one of the plurality of single capacitance elements has a capacitance that causes the oscillation circuit to oscillate at a desired carrier wave frequency; and a modulation control section that controls the floating electrode driving section such that a different at least one of the plurality of single capacitance elements has a capacitance that changes an oscillation frequency of the oscillation circuit in accordance with a modulation signal supplied from an external source.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 13 schematically shows another embodiment of the variable capacitance element 710.

DESCRIPTION OF EXEMPLARY EMBODIMENTS

While the embodiments of the present invention are described below, the technical scope of the invention is not limited to the described embodiments. It is apparent from the scope of the claims that the embodiments added with such alterations or improvements can be included in the technical scope of the invention.

Hereinafter, some embodiments of the present invention will be described. The embodiments do not limit the invention according to the claims, and all the combinations of the features described in the embodiments are not necessarily essential to means provided by aspects of the invention.

Figure 1:
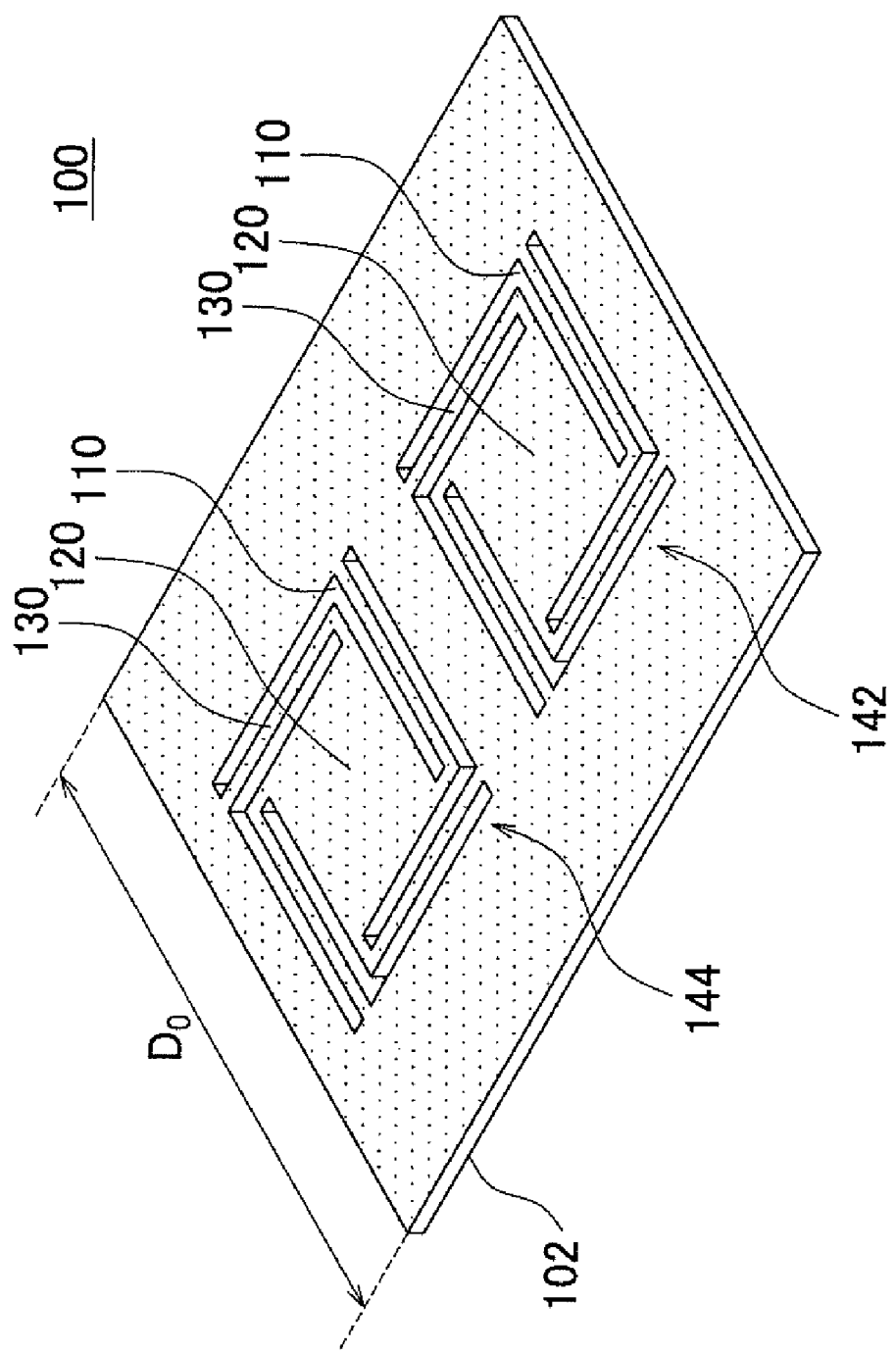
FIG. 1 is a perspective view showing a stage in the process for manufacturing the floating electrode substrate 100.

FIG. 1 is a perspective view showing one stage of a process for manufacturing a floating electrode substrate 100 with an Si wafer as a substrate. First, a plurality of hole patterns 110 are formed on a semiconductor substrate 102. Each hole pattern 110 is L-shaped, and each set of four hole patterns 110 is formed to pass through to the bottom of the semiconductor substrate 102. In this way, a pair of single variable capacitance element regions 142 and 144 are formed on the semiconductor substrate 102. Each of the single variable capacitance element regions 142 and 144 includes a substantially square floating electrode region 120 and four actuator regions 130 that are continuous at the corners of the floating electrode region 120 and support the floating electrode region 120 from the semiconductor substrate 102.

The patterning of the semiconductor substrate 102 described above can be implemented as etching using photolithography, for example. The etching may be wet etching that uses a chemical to dissolve the semiconductor substrate 102, or may be dry etching such as ion milling. As another example, the hole pattern 110 can be drilled using physical processing such as a laser or a micro-drill. In addition to the above processing, a thinning process may be used to decrease the thickness of the semiconductor substrate 102 in a target region. The above processes decrease the mass of the floating electrode region 120 and facilitate deformation of the actuator regions 130.

Figure 2:
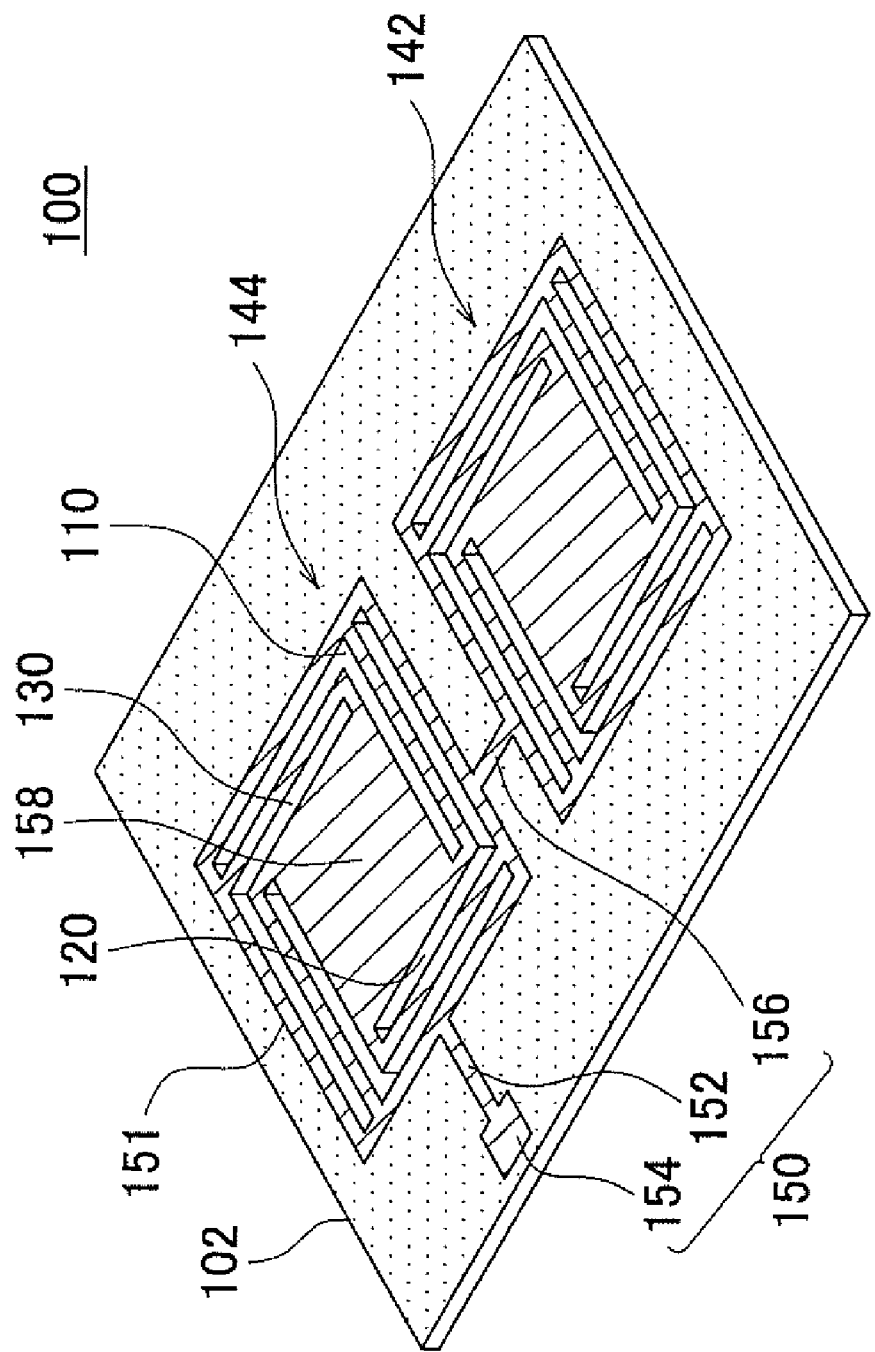
FIG. 2 is a perspective view showing a stage in the process for manufacturing the floating electrode substrate 100.

FIG. 2 is a perspective view showing the next stage of the process for manufacturing the floating electrode substrate 100. At this stage, a conduction layer 150 is formed over the single variable capacitance element regions 142 and 144 on the semiconductor substrate 102 having the hole pattern 110. The conduction layer 150 forms a pattern that includes a floating electrode region 158 that covers the floating electrode region 120, a connection portion 156 that connects the pair of single variable capacitance element regions 142 and 144 to each other, a terminal portion 154 that is used when the conduction layer 150 is connected to something outside of the semiconductor substrate 102, a connection portion 152 that connects the terminal portion 154 to the single variable capacitance element region 144, and an outer periphery 151 that wraps around the outer surface of the floating electrode region 158.

The method for forming the conduction layer 150 may be selected as desired from among evaporation techniques such as spattering that use photolithography. Using metal such as Au as the material for the conduction layer 150 leads to favorable electrical characteristics. If an Au thin film is evaporated on the semiconductor substrate 102, favorable adhesive strength can be achieved and the diffusion of Au to the semiconductor substrate 102 can be prevented by laminating the thin layer of Au after forming a thin layer of Cr or the like.

Figure 3:
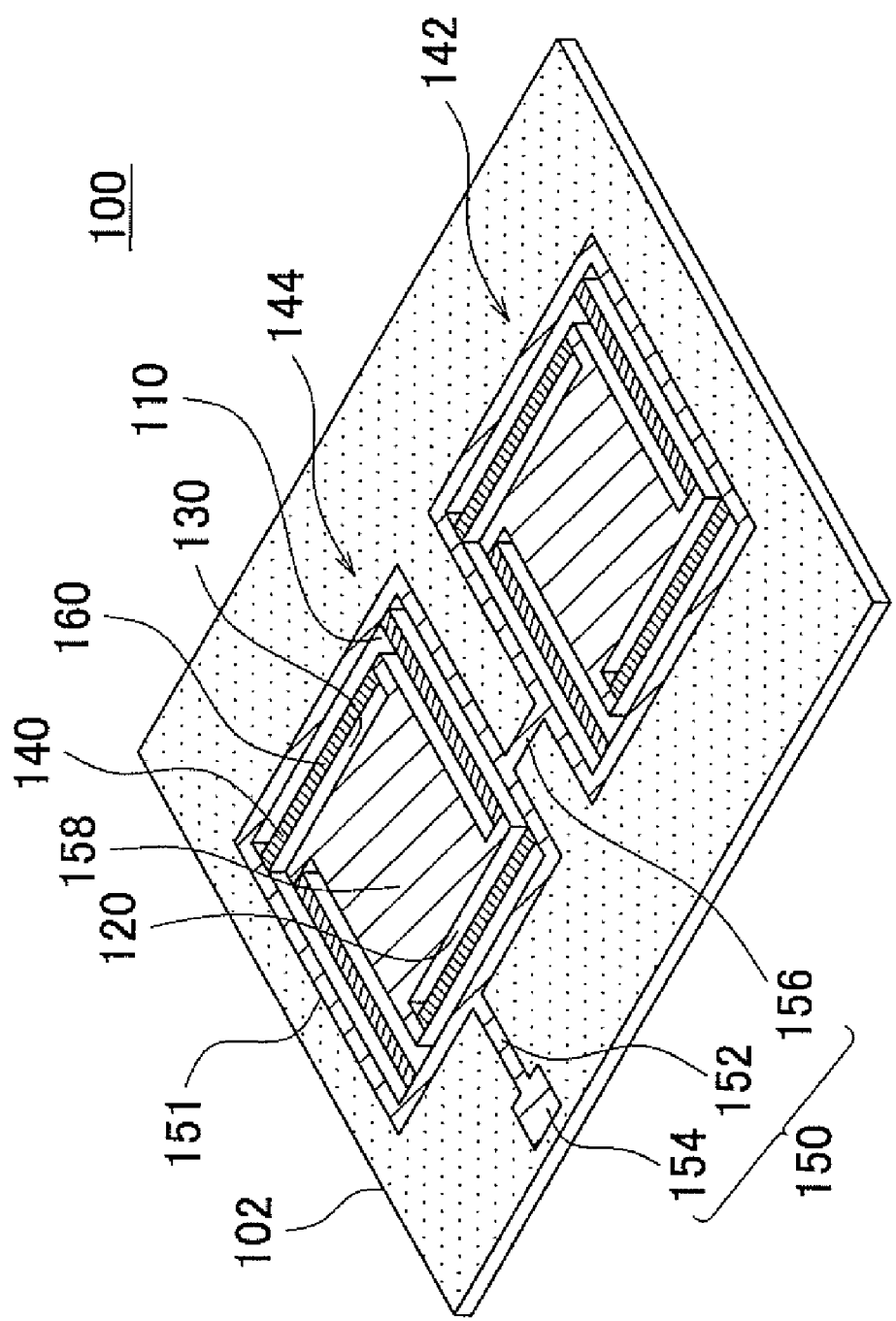
FIG. 3 is a perspective view showing a stage in the process for manufacturing the floating electrode substrate 100.

FIG. 3 is a perspective view showing the next stage of the process for manufacturing the floating electrode substrate 100. At this stage, a piezoelectric material layer 160 is formed on each actuator region 130 of the semiconductor substrate 102. Any material may be selected as the piezoelectric material, but PZT is selected here as being suitable for the intended application. The piezoelectric material layer 160 can be formed by evaporation techniques that use photolithography or the like.

Figure 4:
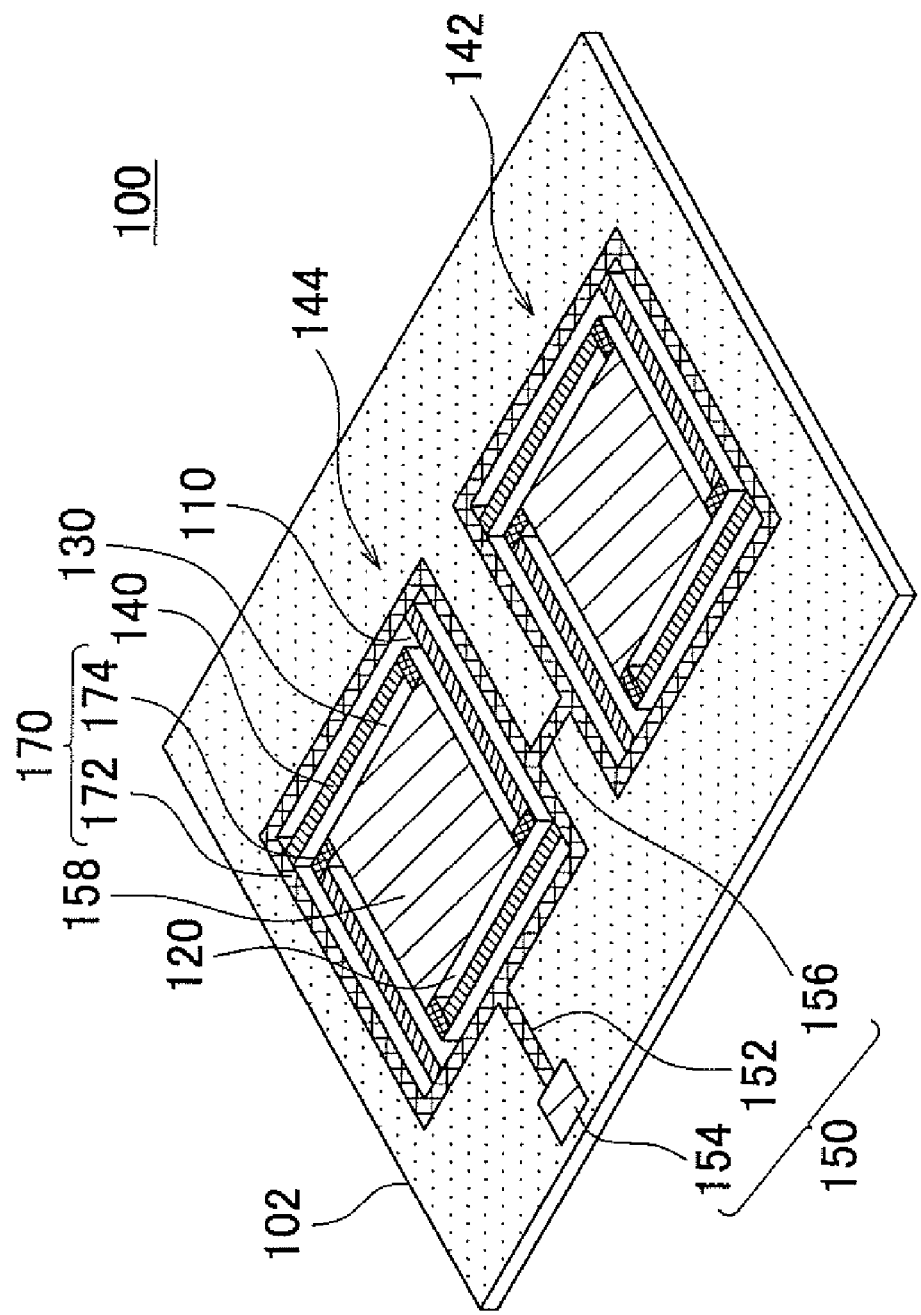
FIG. 4 is a perspective view showing a stage in the process for manufacturing the floating electrode substrate 100.

FIG. 4 is a perspective view showing the next stage of the process for manufacturing the floating electrode substrate 100. At this stage, an insulation layer 170 is formed that includes an outer insulation layer 172 and an inner insulation layer 174, which are connected to both ends of the region formed by the piezoelectric material layer 140. The outer insulation layer 172 covers the outer periphery of the conduction layer 150, and extends over the connection portions 152 and 156 of the conduction layer 150. The material of the insulation layer 170 can be selected from among various types of oxides, nitrates, and the like. Photolithography can be used to simultaneously form the outer insulation layer 172 and the inner insulation layer 174.

Figure 5:
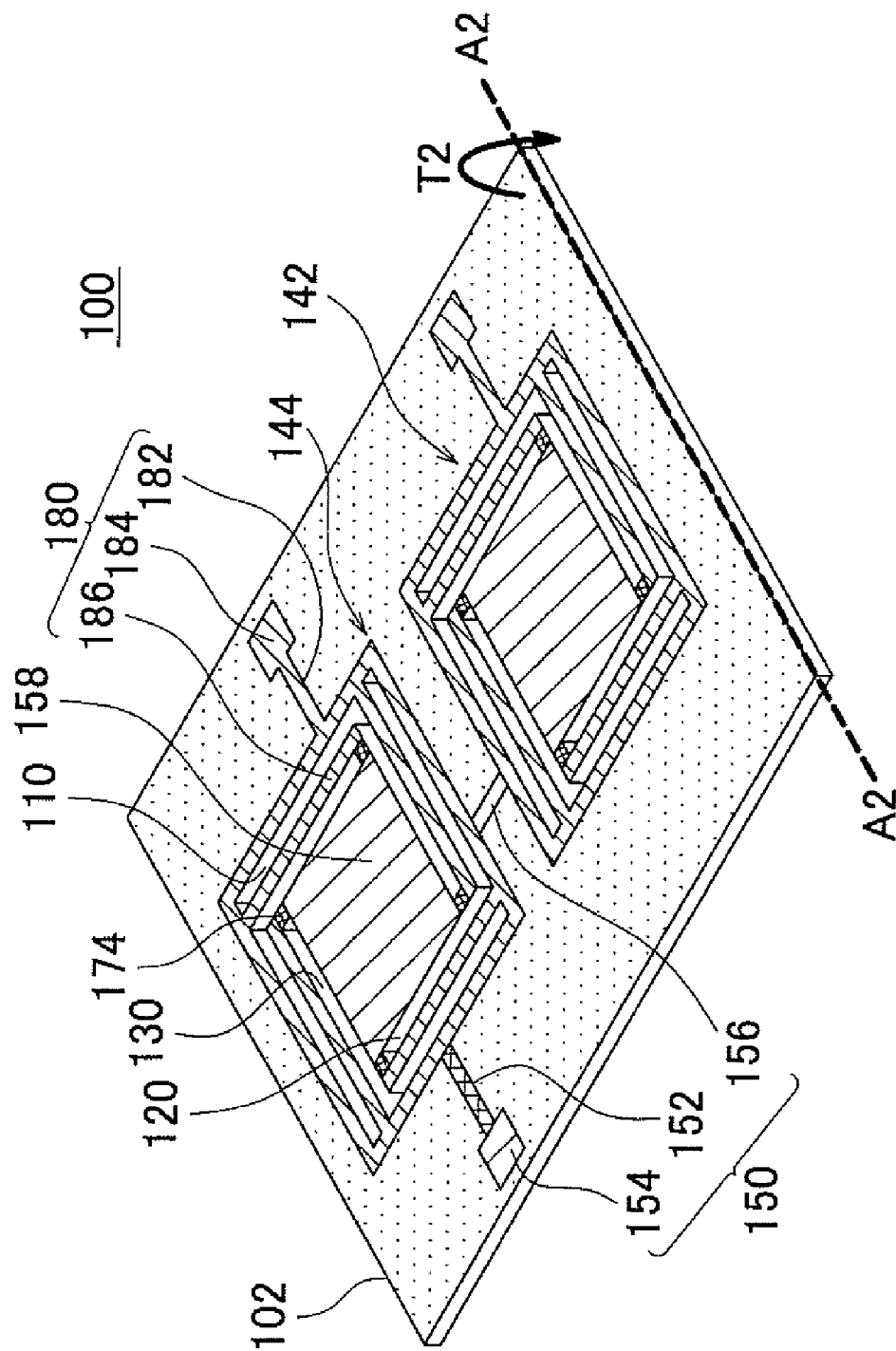
FIG. 5 is a perspective view showing a stage in the process for manufacturing the floating electrode substrate 100.

FIG. 5 is a perspective view showing the next stage of the process for manufacturing the floating electrode substrate 100. At this stage, another conduction layer 180 is formed on the floating electrode substrate 100 shown in FIG. 4. The conduction layer 180 includes a drive electrode region 186 that covers the top of the actuator region 130, and covers the outer periphery 151. At this point, the floating electrode substrate 100 is completed.

It should be noted that the conduction layer 180 is not formed on the connection portion 156 that connects the pair of single variable capacitance element regions 142 and 144 to each other. Accordingly, as far as the conduction layer 180 is concerned, the single variable capacitance element region 142 is separate from the single variable capacitance element region 144. Since the conduction layer 180 is formed on the piezoelectric material layer 160 or the insulation layer 170, the conduction layer 180 is electrically separated from the conduction layer 150 formed directly on the semiconductor substrate 102.

In other words, by creating a potential difference between the conduction layers 150 and 180, a voltage can be applied to the piezoelectric material layer 160. The conduction layer 180, which is the top layer, is formed separately for the single variable capacitance element region 142 and the single variable capacitance element region 144, and so voltage is applied separately to the piezoelectric material layer 160 of the single variable capacitance element region 142 and the single variable capacitance element region 144, causing the actuator to function. Furthermore, in each of the pair of single variable capacitance element regions 142 and 144, the actuators are connected at uniform intervals and arranged symmetrically with respect to the center of the floating electrode region 158. Accordingly, each entire floating electrode region 158 can be moved effectively.

In the same manner as the conduction layer 150, the conduction layer 180 may be formed by a method selected as desired from among evaporation techniques such as spattering that use photolithography. Any conductive material may be selected for the conduction layer 180, but noble metals such as Au and Pt are desirable due to high chemical stability and superior electrical characteristics.

Figure 6:
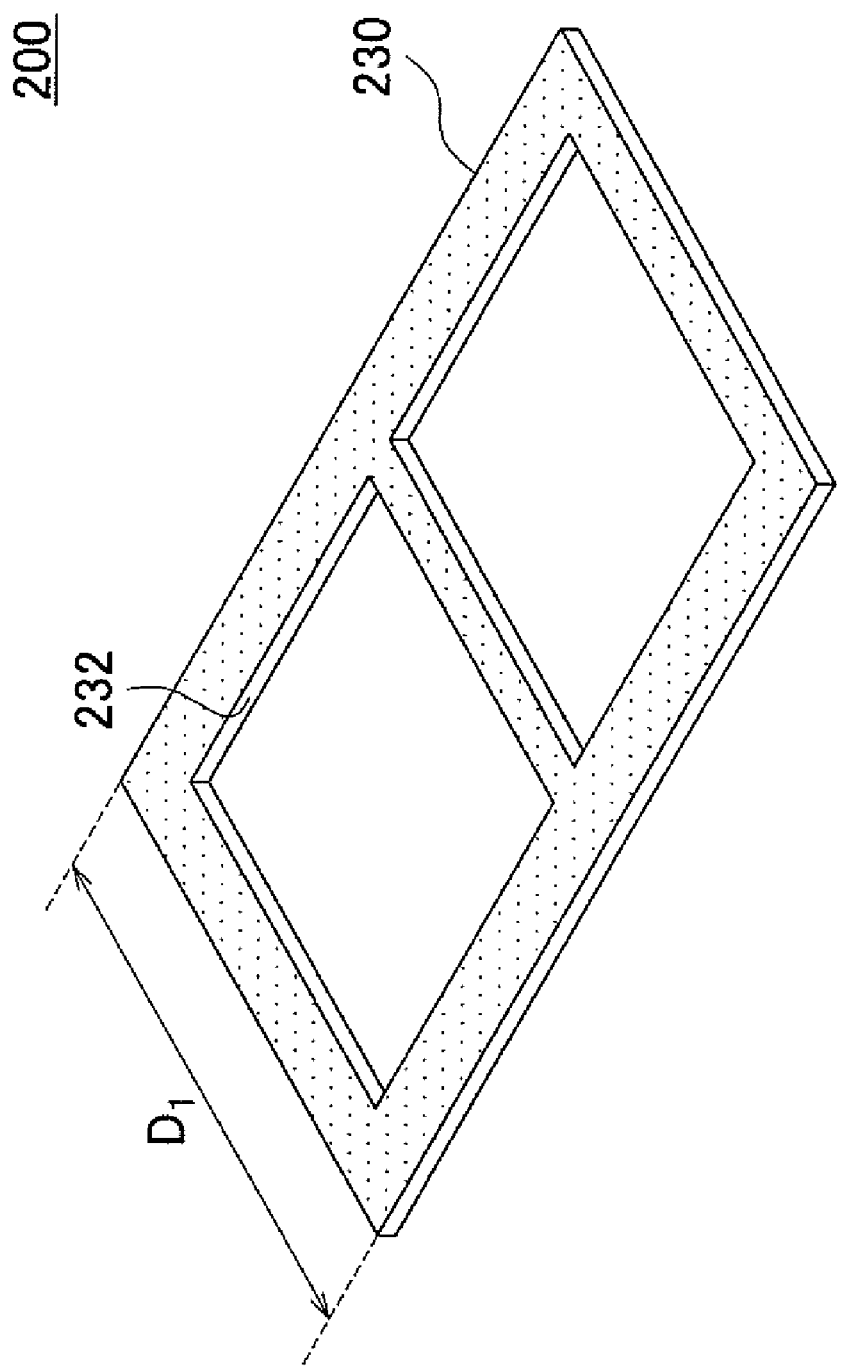
FIG. 6 is a perspective view showing a stage in the process for manufacturing the spacer substrate 200.

FIG. 6 is a perspective view showing a stage in the process of manufacturing the spacer substrate 200 that is sandwiched between the floating electrode substrate 100 and a fixed electrode substrate 300, described further below, to maintain a space therebetween. The depth $D_1$ of the semiconductor substrate 230 is less than the depth $D_0$ of the semiconductor substrate 102, and the terminal portions 154 and 184 of the conduction layers 150 and 180 are exposed on the outside when the spacer substrate 200 is laminated onto the floating electrode substrate 100.

The spacer substrate 200 can be manufactured by processing the square semiconductor substrate 230 in the same manner as the floating electrode substrate 100. As shown in FIG. 6, the spacer substrate 200 includes a pair of hole patterns 232 that are positioned to surround the pair of single variable capacitance element regions 142 and 144. The shape of the hole patterns 232 can be formed by various types of etching using photolithography, laser processing, or machining processing.

Figure 7:
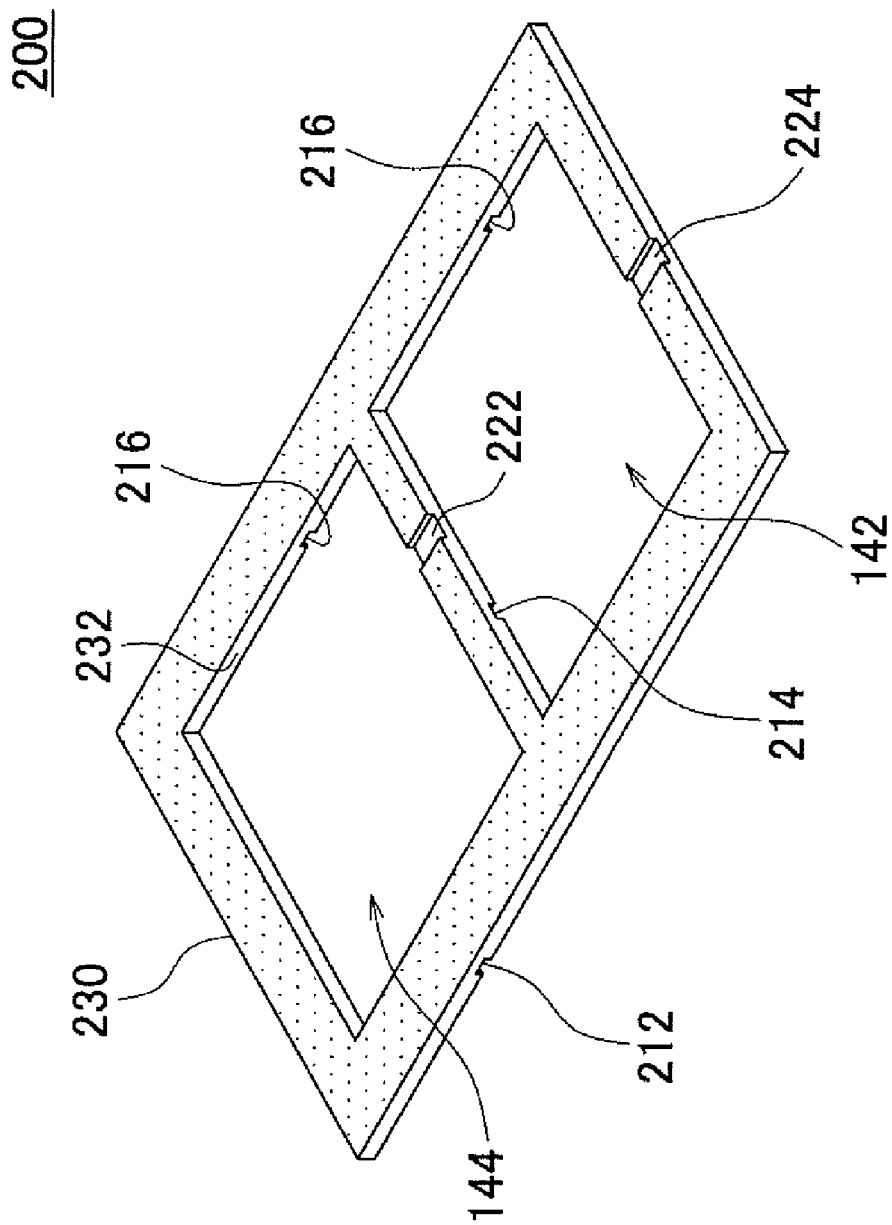
FIG. 7 is a perspective view showing a stage in the process for manufacturing the spacer substrate 200.

FIG. 7 is a perspective view showing the next stage of the process for manufacturing the spacer substrate 200. At this stage, fixed electrode notches 222 and 224 are formed on the top of the spacer substrate 200, and floating electrode notches 212, 214, and 216 are formed on the bottom of the spacer substrate 200. The fixed electrode notch 224 and the floating electrode notches 212 and 216 pass through the hole pattern 232 from the inside to the outside. The fixed electrode notch 222 and the floating electrode notch 214 pass through between the hole patterns 232. The floating electrode notches 212, 214, and 216 and the fixed electrode notches 222 and 224 can be formed by various types of etching using photolithography, laser processing, or machine processing.

Figure 8:
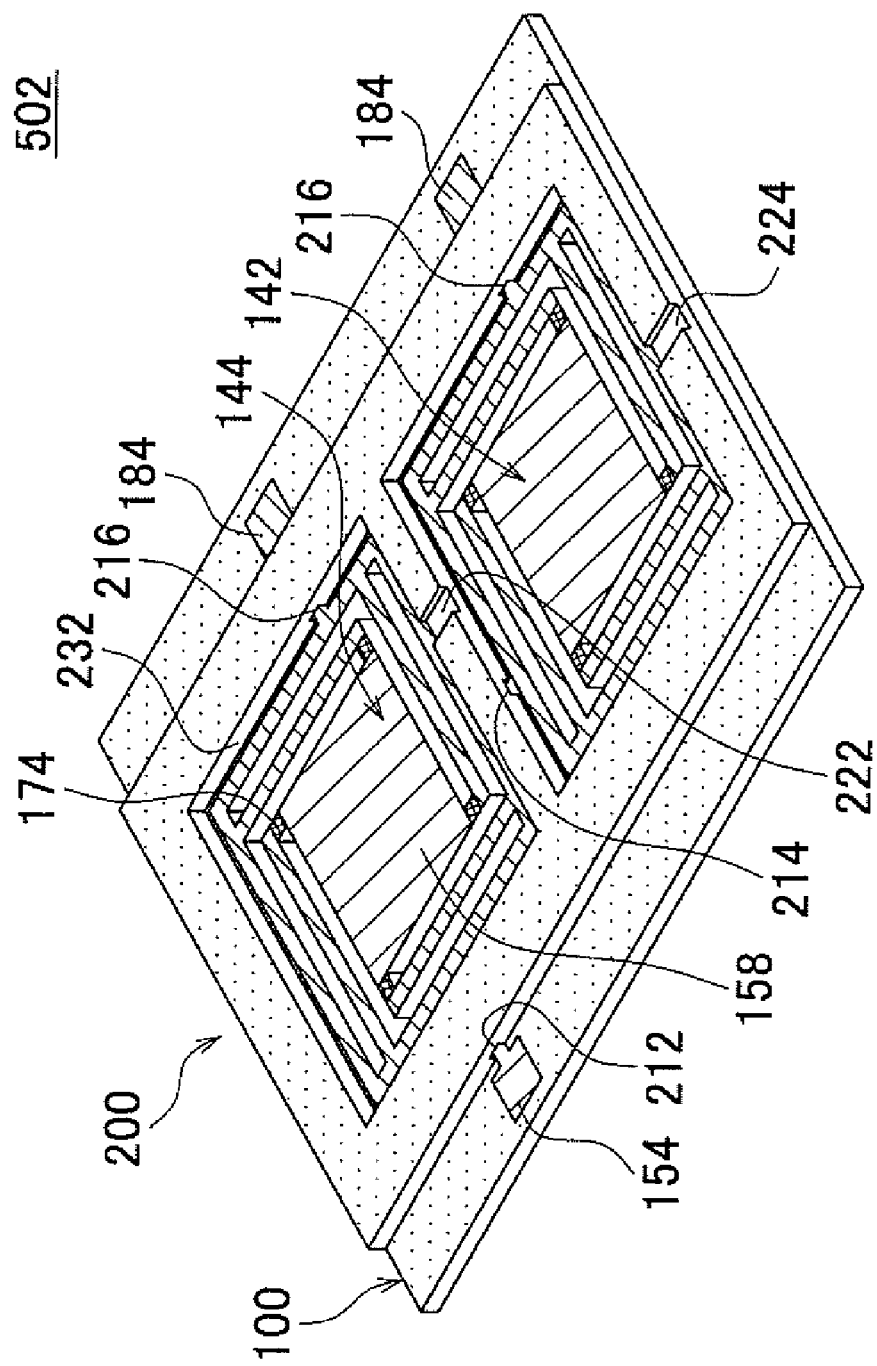
FIG. 8 is a perspective view showing the floating electrode assembly 502.

FIG. 8 is a perspective view showing a floating electrode assembly 502 resulting from the lamination of the floating electrode substrate 100 and the spacer substrate 200. The spacer substrate 200 is positioned on the floating electrode substrate 100 such that the hole patterns 232 surround the single variable capacitance element regions 142 and 144, and is then laminated to be adhered to the floating electrode substrate 100.

The connection portions 152 and 182 on the floating electrode substrate 100 pass through the floating electrode notches 212 and 216 on the bottom of the spacer substrate 200, respectively, and extend to the outside of the spacer substrate 200. Accordingly, the terminal portions 154 and 184 of the conduction layer 150 are exposed on the outside of the spacer substrate 200. The connection portion 156 of the conduction layer 150 passes through the floating electrode notch 214 on the bottom of the spacer substrate 200 to connect the pair of single variable capacitance element regions 142 and 144 to each other.

Figure 9:
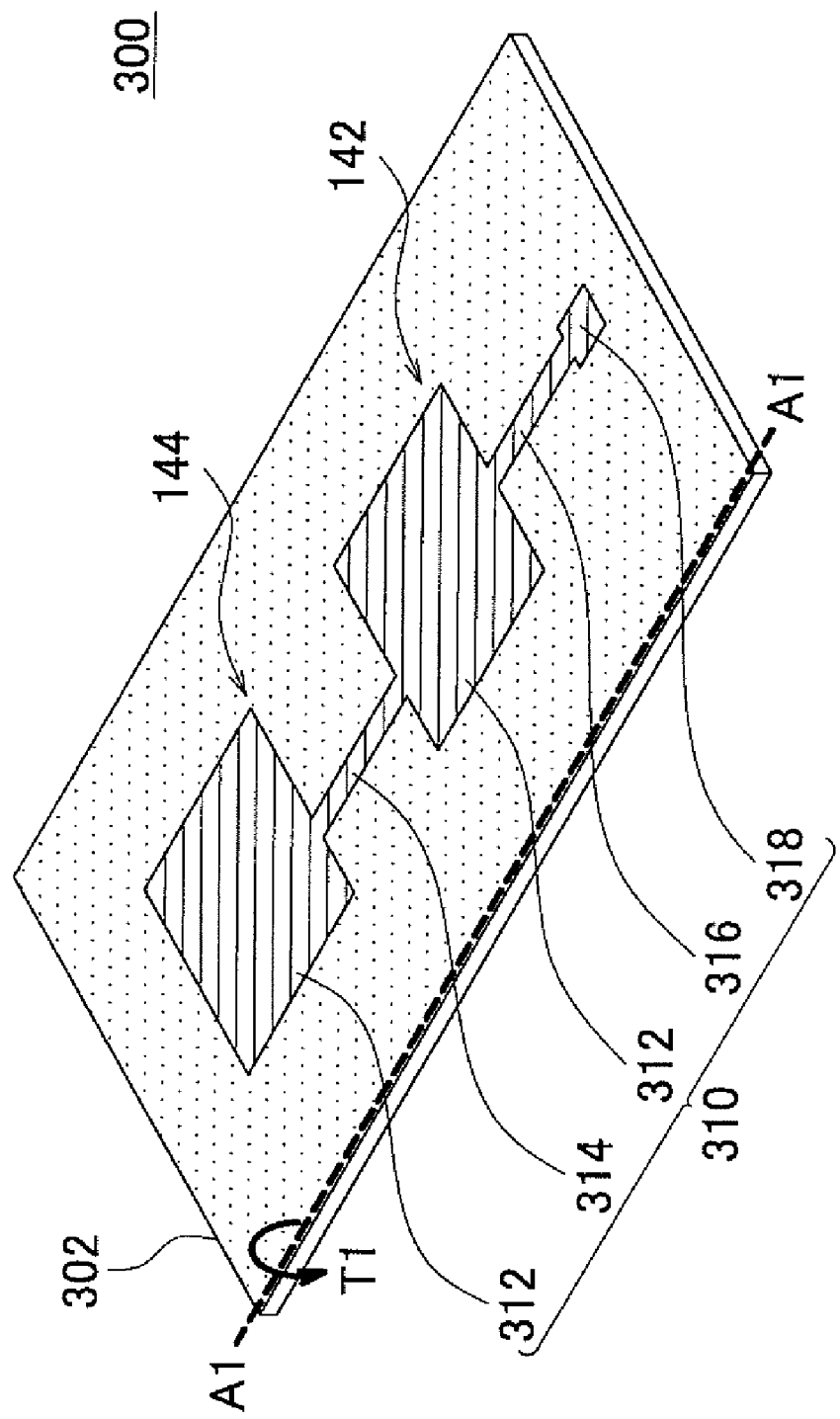
FIG. 9 is a perspective view showing a stage in the process for manufacturing the fixed electrode substrate 300.

FIG. 9 is a perspective view showing a process for manufacturing a fixed electrode substrate 300 that is laminated on the floating electrode assembly 502. The fixed electrode substrate 300 is formed by loading a conduction layer 310 onto a square semiconductor substrate 302 having the same dimensions as the spacer substrate 200.

The conduction layer 310 includes a pair of fixed electrode regions 312, a connection portion 314 that connects the fixed electrode regions 312 to each other, a terminal portion 318 that connects the fixed electrode regions 312 to the outside, and a connection portion 316 that connects the terminal portion 318 to the fixed electrode regions 312. The fixed electrode regions 312 correspond respectively to the single variable capacitance element regions 142 and 144.

The pattern of the conduction layer 310 can be formed with conductive material deposition achieved from any evaporation technique and patterning using photolithography. Any conductive material can be selected as the material of the conduction layer 310, but noble metals such as Au and Pt are desirable due to high chemical stability and superior electrical characteristics. Improved adhesive strength of the conduction layer 310 can be achieved and the diffusion of the material used for the conduction layer 310 to the semiconductor substrate 302 can be prevented by forming a thin undercoating of Cr or the like on the surface of the semiconductor substrate 302 prior to forming the conduction layer 310.

Figure 10:
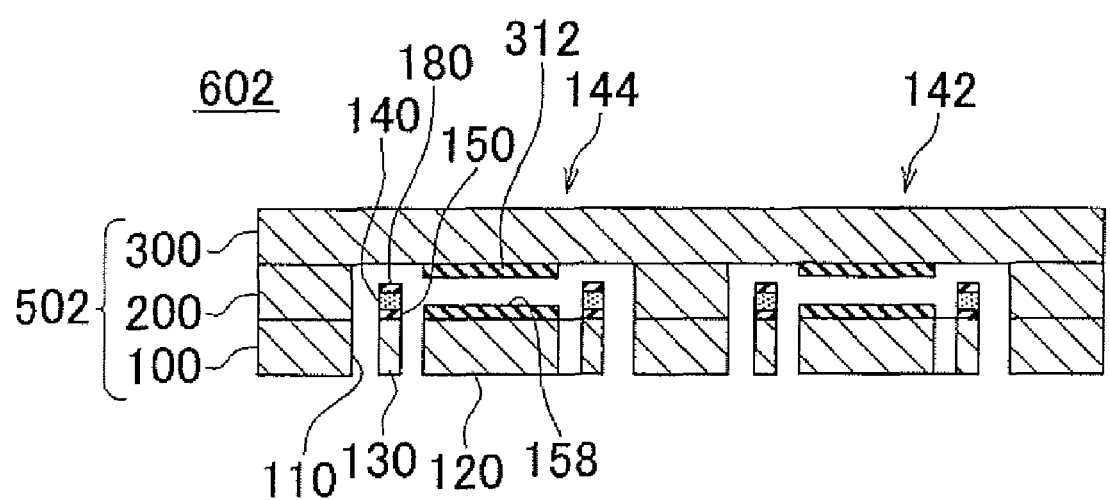
FIG. 10 is a cross-sectional view schematically showing the layered structure of the variable capacitance element 602.

FIG. 10 is a cross-sectional view showing the layered structure of a variable capacitance element 602 manufactured as described above. The variable capacitance element 602 is formed by laminating the fixed electrode substrate 300 shown in FIG. 9 onto the floating electrode assembly 502 shown in FIG. 8. Here, the fixed electrode substrate 300 is laminated onto the floating electrode assembly 502 after flipping the fixed electrode substrate 300 over the dotted line A1 in FIG. 9 in a direction of the arrow T1. Therefore, the floating electrode region 158 of the conduction layer 150 on the floating electrode substrate 100 faces the fixed electrode region 312 of the conduction layer 310 on the fixed electrode substrate 300.

In the variable capacitance element 602 having the above structure, a voltage is applied between the conduction layers 150 and 180 to move the floating electrode region 158, so that the space between the floating electrode region 158 and the fixed electrode region 312 changes, thereby changing the capacitance between the floating electrode region 158 and the fixed electrode region 312. The pair of single variable capacitance element regions 142 and 144 are connected to each other in parallel by the connection portion 156 of the conduction layer 150 and the connection portion 314 of the conduction layer 310. Therefore, the combined capacitance of the pair of single variable capacitance element regions 142 and 144 is created between the terminal portion 154 of the conduction layer 150 and the terminal portion 318 of the conduction layer 310.

Furthermore, in the variable capacitance element 602, the actuator region 130 extends to the outside from the outer periphery of the floating electrode region 158, so that the space between the conduction layer 150 in the floating electrode region 158 and the conduction layer 310 in the fixed electrode region 312 is almost completely filled with air. As a result, the floating electrode region 158 can be moved with a large stroke and the single variable capacitance element regions 142 and 144 can be set to have a high capacitance, and so the resulting variable capacitance element 602 has a large rate of change.

Figure 11:
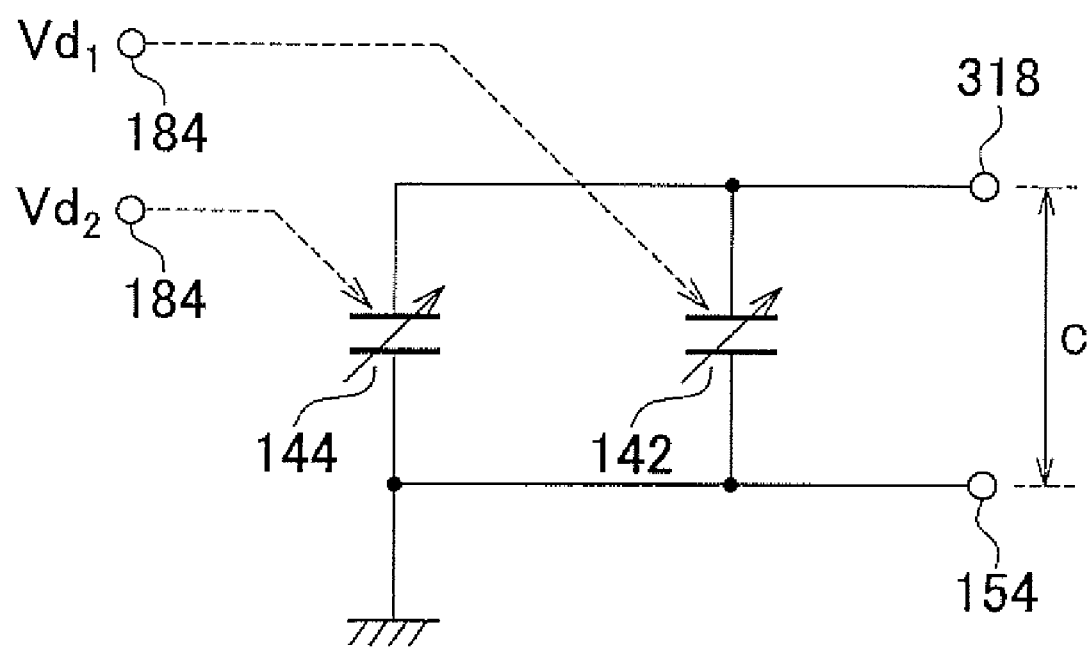
FIG. 11 schematically shows the electrical function of the variable capacitance element 602.

FIG. 11 schematically shows the electrical function of the variable capacitance element 602. The variable capacitance element 602 has an electrical structure in which the pair of single variable capacitance element regions 142 and 144 are connected to each other. Drive voltages can be applied separately to the actuator region 130 in the single variable capacitance element region 142 and the actuator region 130 in the single variable capacitance element region 144, via the terminal portion 184. Accordingly, by applying a drive voltage to the piezoelectric material layer 140 from a floating electrode driving section formed as the voltage source, the floating electrode region 120 can be brought near or moved away from the fixed electrode region 312. In this way, the capacitances of the single variable capacitance element regions 142 and 144 can be individually changed.

The overall capacitance C of the variable capacitance element 602 is a combination of the capacitances of the single variable capacitance element regions 142 and 144. Therefore, the capacitance C of the variable capacitance element 602 can be changed by selecting suitable drive voltages $Vd_1$ and $Vd_2$. In this case, the drive voltages $Vd_1$ and $Vd_2$ may be changed separately or simultaneously. Instead, one of the drive voltages may be fixed while the other is changed. In this way, the rate of change of the capacitance C of the variable capacitance element 602 can be increased, so that small adjustments become easier. Furthermore, the overall maximum capacitance of the variable capacitance element 602 is increased due to the combination of the plurality of single variable capacitance element regions 142 and 144.

Figure 12:
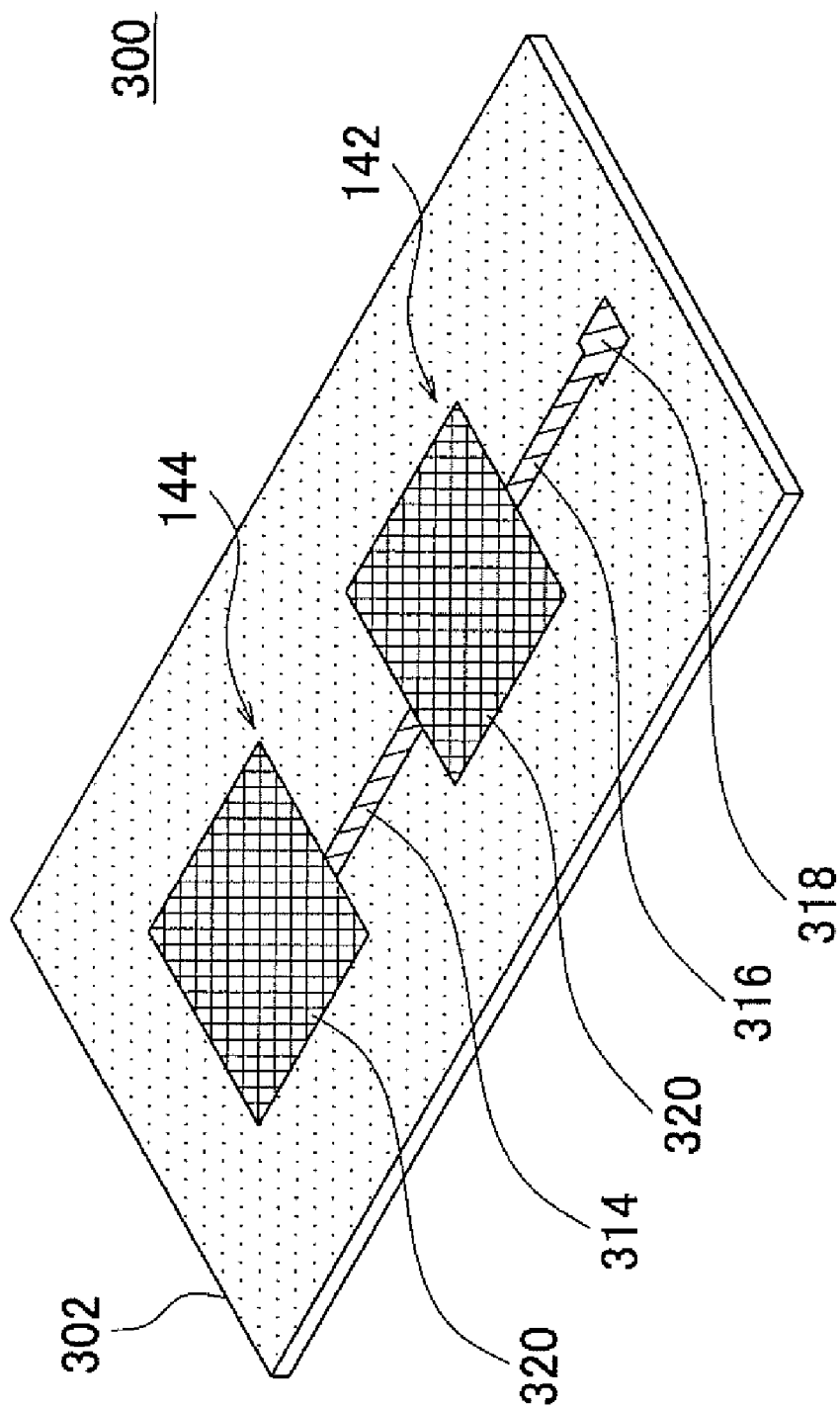
FIG. 12 is a perspective view showing a stage in the process for manufacturing the fixed electrode substrate 300.

FIG. 12 is a perspective view showing another embodiment of the process for manufacturing the fixed electrode substrate 300. In this embodiment, a dielectric layer 320 is formed on the fixed electrode region 312. By using the fixed electrode substrate 300 provided with the dielectric layer 320 to form the variable capacitance element 602, a short between the fixed electrode region 312 of the conduction layer 310 and the conduction layer 150 of the floating electrode substrate 100 can be prevented. The dielectric layer 320 can be provided on the surface of the floating electrode region 158, but providing the dielectric layer 320 on the fixed electrode region 312, which is not moved, is beneficial for improving the response time of the variable capacitance element 602. The dielectric layer 320 can be made of any material and formed by photolithography.

FIG. 13 schematically shows the structure of a variable capacitance element 710 according to another embodiment. The variable capacitance element 710 includes a plurality of single variable capacitance elements 141, and all of the single variable capacitance elements 141 receive a common drive voltage $Vd_3$ to be driven simultaneously. As a result, the variable capacitance element 710 has an extremely large overall capacitance C, and the rate of change of the capacitance C is also extremely large. Furthermore, since each single variable capacitance element 141 includes an independent actuator region 130, the operating speed when displacing the floating electrode region 120 is the same for a large capacitance C as it is for a small capacitance. Therefore, regardless of an increase in the capacitance C, the response speed to a change in the drive voltage $Vd_3$ is the same as that of the single variable capacitance element 141.

Figure 14:
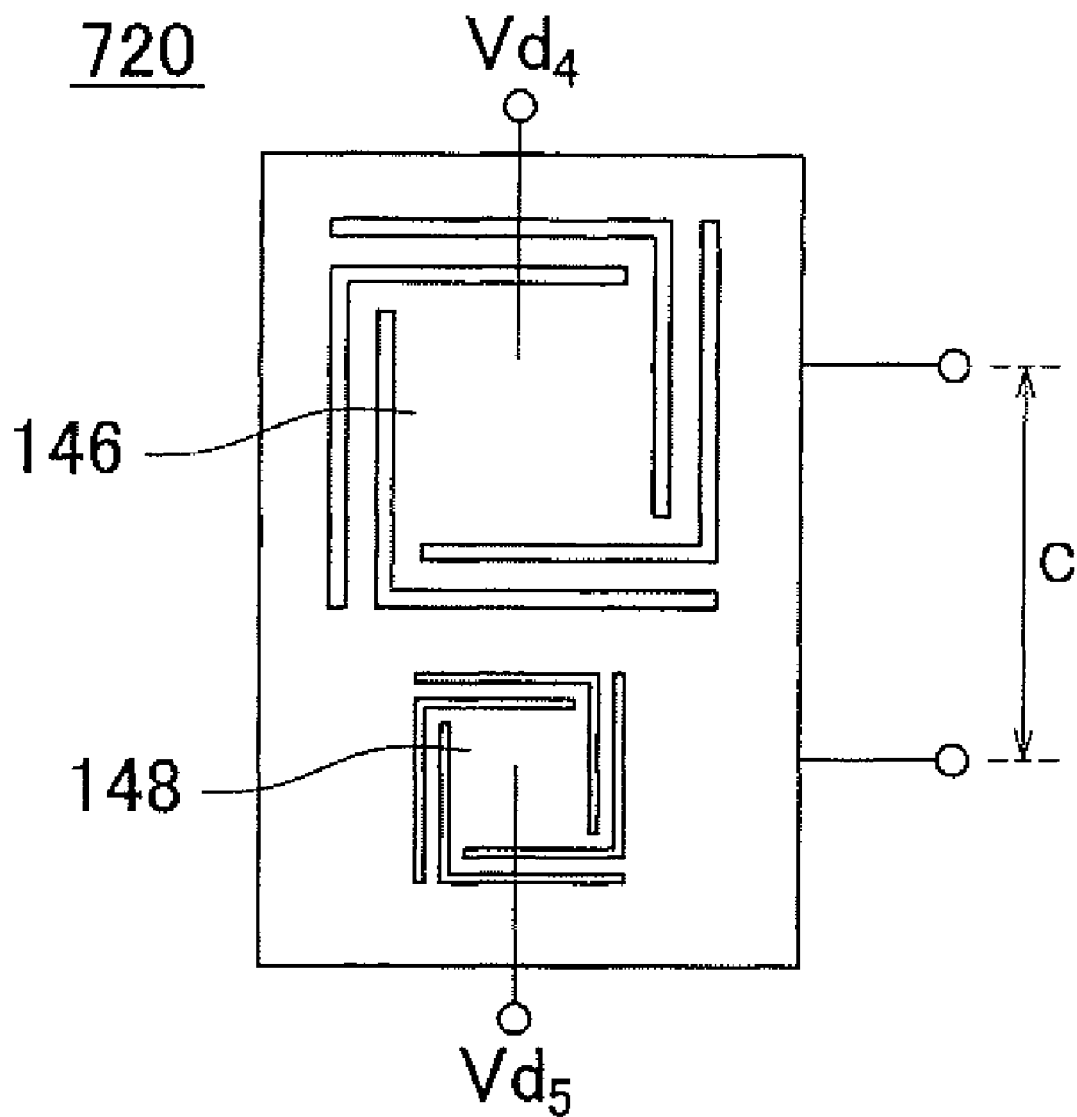
FIG. 14 schematically shows another embodiment of the variable capacitance element 720.

FIG. 14 schematically shows the structure of a variable capacitance element 720 according to another embodiment. The variable capacitance element 720 includes a combination of a single variable capacitance element 148 and a large single variable capacitance element 146 having greater dimensions than the single variable capacitance element 148. As a result, the capacitance C, which is roughly determined by driving the floating electrode of the large single variable capacitance element 146 with a drive voltage $Vd_4$, can be more finely adjusted by independently driving the single variable capacitance element 148 with a drive voltage $Vd_5$. Therefore, the variable capacitance element 720 has both a large capacitance C and a function for fine capacitance adjustment.

Figure 15:
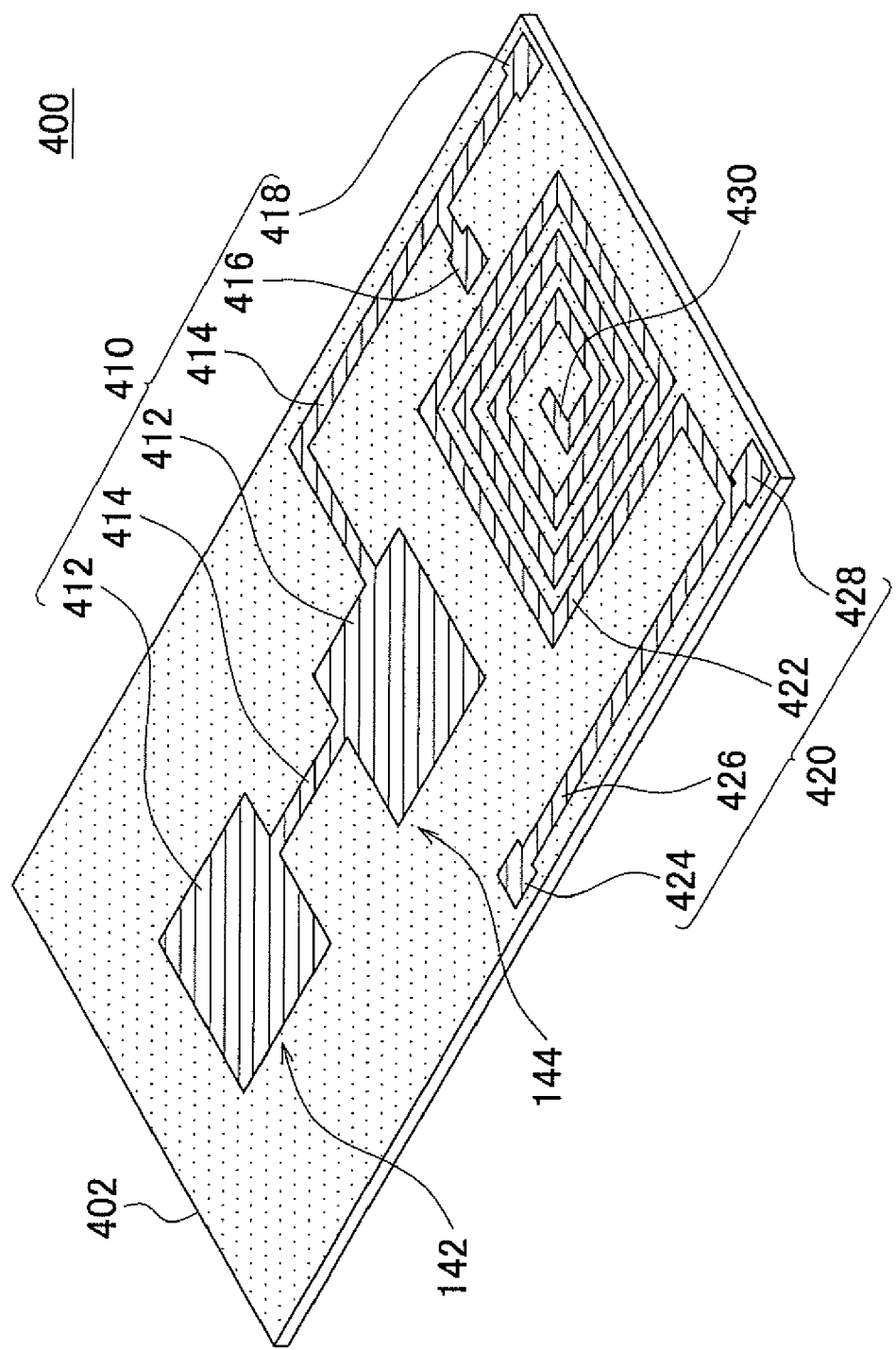
FIG. 15 is a perspective view showing a stage in the process for manufacturing the fixed electrode substrate 400.

FIG. 15 is a perspective view showing a stage in a process for manufacturing a fixed electrode substrate 400 when forming a variable resonator 604 according to another embodiment. The fixed electrode substrate 400 includes, in addition to a conduction layer 410 that includes a pattern forming fixed electrodes, a conduction layer 420 having a coil 422.

The conduction layer 410 includes a pair of fixed electrode regions 412, a terminal portion 418 that connects the fixed electrode regions 412 to the outside, and a connection portion 414 that connects the fixed electrode regions 412 to each other and connects the terminal portion 418 to the fixed electrode regions 412. The conduction layer 410 further includes a terminal portion 416 that is used when connecting to the coil 422, described further below. In the conduction layer 410, the fixed electrode regions 412 correspond respectively to the single variable capacitance element regions 142 and 144.

The conduction layer 420 includes a pair of terminal portions 424 and 428, the coil 422, and a connection portion 426 that connects the terminal portions 424 and 428 and the coil 422 to each other. The terminal portion 428 is used when connecting the variable resonator 604 to the outside. The terminal portion 424 is used when connecting the fixed electrode substrate 400 to the floating electrode substrate 100, as described further below.

The pattern of the conduction layer 410 can be formed with conductive material deposition achieved from any evaporation technique and patterning using photolithography. Any conductive material can be selected as the material of the conduction layer 410, but noble metals such as Au and Pt are desirable due to high chemical stability and superior electrical characteristics. Improved adhesive strength of the conduction layer 310 can be achieved and the diffusion of the material used for the conduction layer 410 to the semiconductor substrate 402 can be prevented by forming a thin undercoating of Cr or the like on the surface of the semiconductor substrate 402 prior to forming the conduction layer 410.

Figure 16:
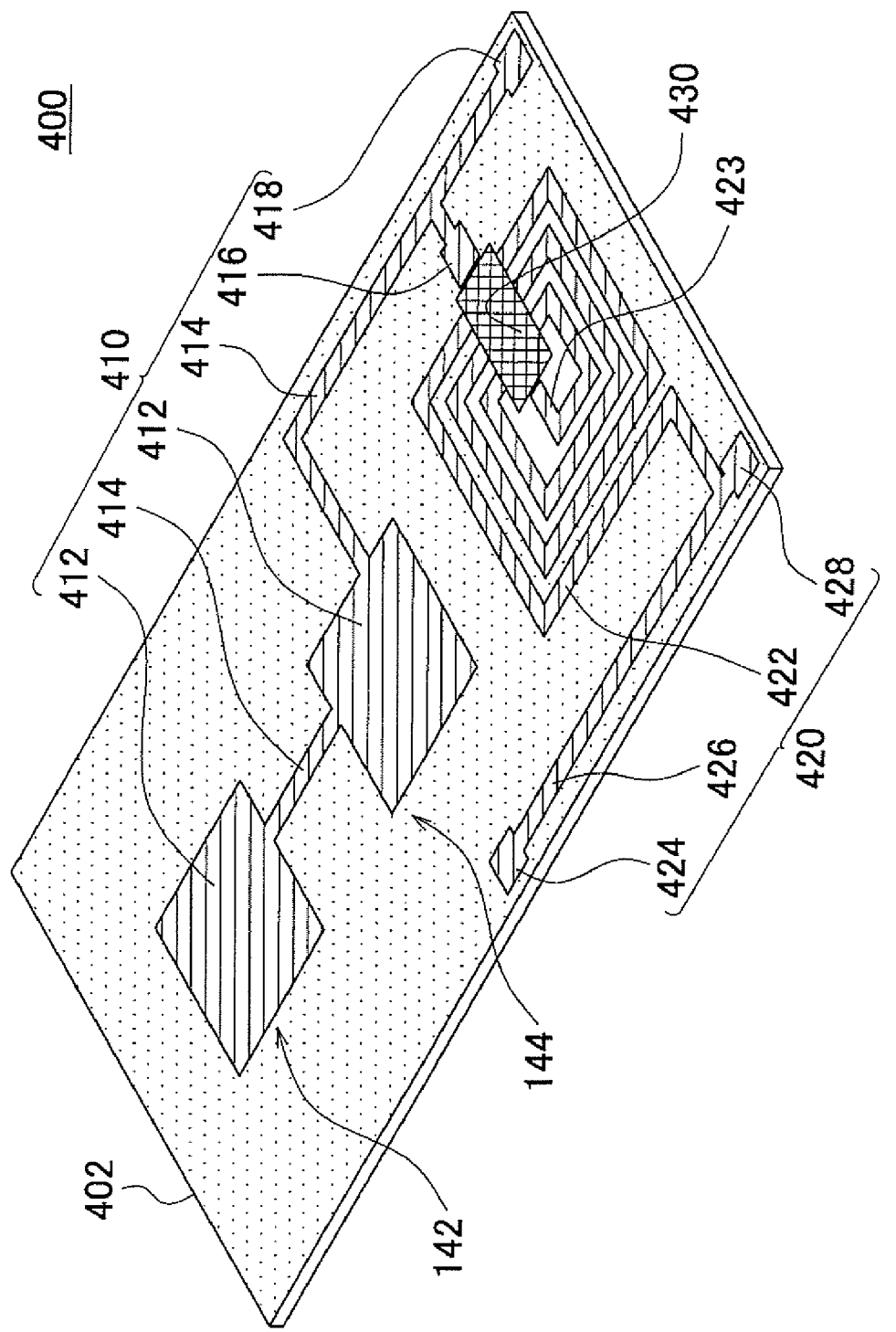
FIG. 16 is a perspective view showing a stage in the process for manufacturing the fixed electrode substrate 400.

FIG. 16 is a perspective view showing the next stage in the process for manufacturing the fixed electrode substrate 400.

At this stage, an insulation layer 430 is formed over a portion of the conduction layer 410 and the conduction layer 420. In other words, The insulation layer 430 formed on top of the conduction layer 420 prevents the cross-over formed by the conduction layer 440, described further below, from forming a short with the coil 422 of the conduction layer 420.

Although not displayed, an insulation layer may be formed on the conduction layer 410 to serve the same function as the dielectric layer 320 formed on the conduction layer 310 in FIG. 12. Therefore, in the variable resonator 604, the conduction layer 410 of the fixed electrode substrate 400 can be prevented from forming a short with the conduction layer 150 in the floating electrode substrate 100. The insulation layer can be provided on the surface of the floating electrode region 158, but providing the insulation layer on the fixed electrode region 412, which is not moved, is beneficial for improving the response time of the variable resonator 604.

Figure 17:
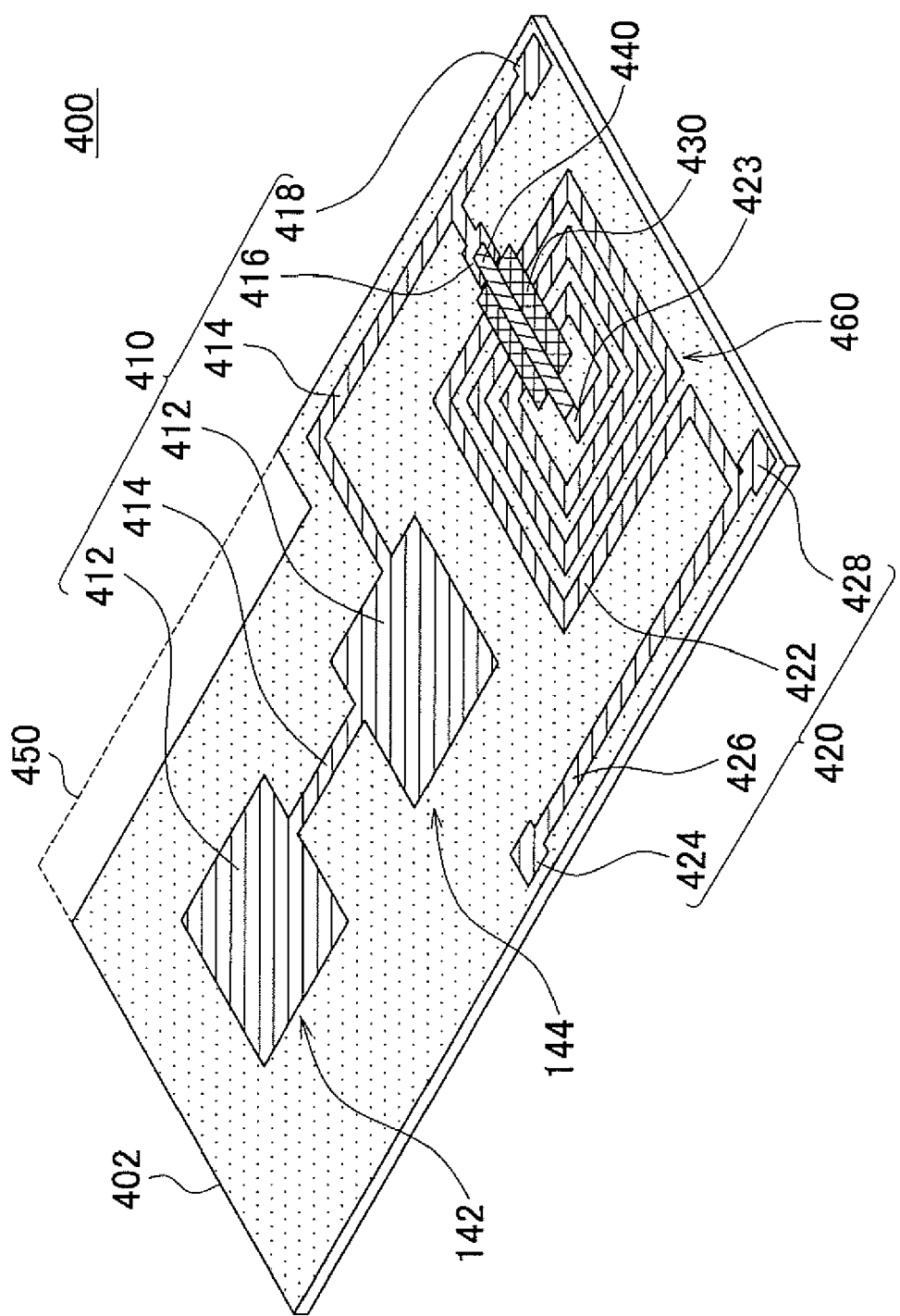
FIG. 17 is a perspective view showing a stage in the process for manufacturing the fixed electrode substrate 400.

FIG. 17 is a perspective view showing the next stage in the process for manufacturing the fixed electrode substrate 400. At this stage, a conduction layer 440 is formed on the insulation layer 430, which is formed on the coil 422 of the conduction layer 420. One end of the conduction layer 440 overlaps the terminal portion 423 formed at the end of the inner side of the coil 422, and the other end of the conduction layer 440 overlaps the terminal portion 416 of the conduction layer 410. As a result, the one end of the coil 422 can be connected to the connection portion 414 of the conduction layer 410.

Furthermore, at this stage, a removed portion 450 is formed on the upper left side of the semiconductor substrate 402, as shown in FIG. 17. The removed portion 450 is formed to facilitate connection of the terminal portion 184 onto the floating electrode substrate 100 when the variable resonator 604 is in an assembled state.

Figure 18:
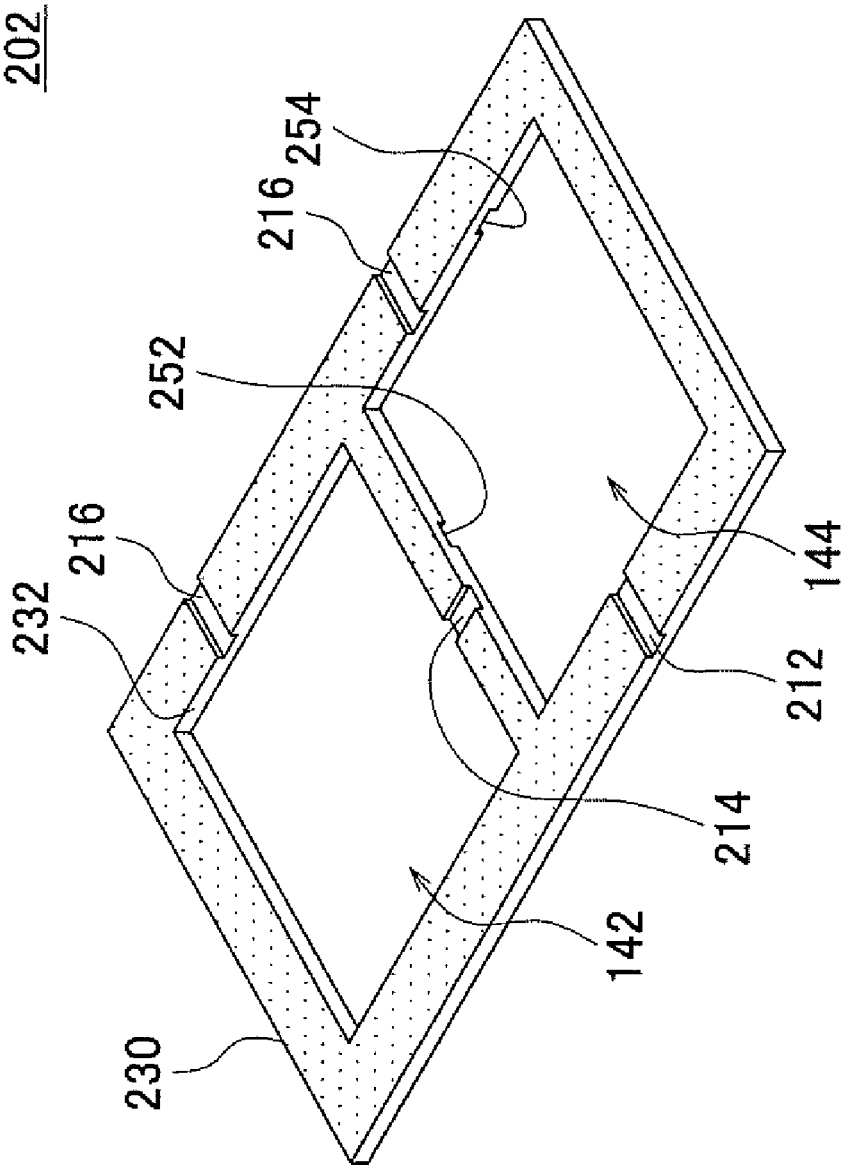
FIG. 18 is a perspective view showing a stage in the process for manufacturing the spacer substrate 202.

FIG. 18 is a perspective view showing a stage in the process for manufacturing the spacer substrate 202 with a shape differing from that of the spacer substrate 200 shown in FIG. 7. The shapes of the spacer substrate 202 differs from that of the spacer substrate 200 in regards to the arrangement of the fixed electrode notches 252 and 254 on one surface, and therefore the spacer substrate 200 can be used up until the stage at which the fixed electrode notches 252 and 254 are formed. The fixed electrode notches 252 and 254 formed on the bottom of the spacer substrate 202 pass through to the connection portion 414 of the conduction layer 410 on the fixed electrode substrate 400.

Figure 19:
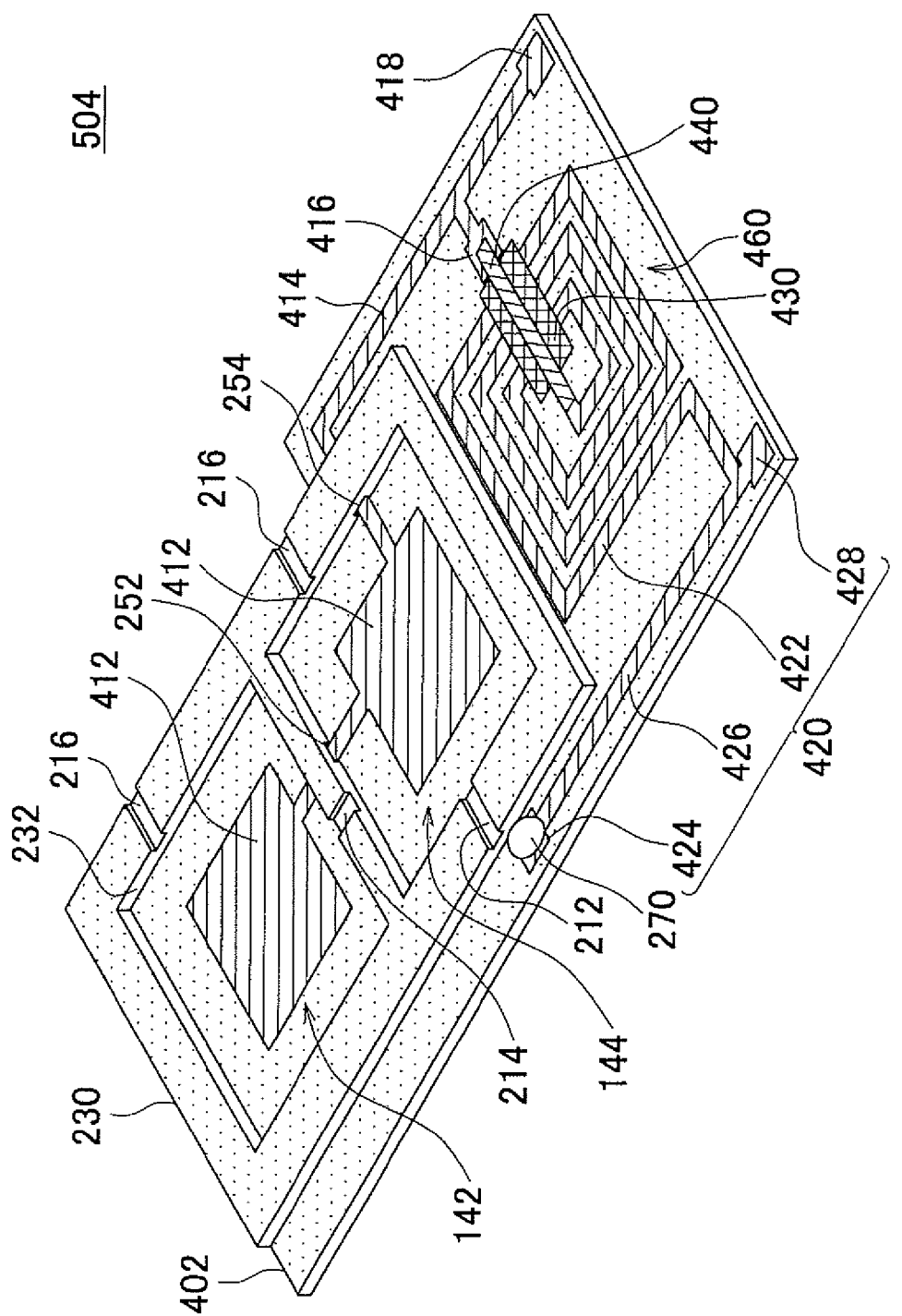
FIG. 19 is a perspective view showing the structure of the fixed electrode assembly 504.

FIG. 19 is a perspective view showing a fixed electrode assembly 504 formed by adhering the spacer substrate 202 to the floating electrode substrate 100. The spacer substrate 202 is positioned on the fixed electrode substrate 400 such that the hole patterns 232 surround the single variable capacitance element regions 142 and 144, and is then laminated to be adhered to the fixed electrode substrate 400.

Here, the connection portion 414 on the fixed electrode substrate 400 passes through the fixed electrode notches 252 and 254 formed on the bottom of the spacer substrate 202. The coil 422 of the conduction layer 420 is positioned outside of the spacer substrate 202. At this stage, the solder ball 270 is provided on the terminal portion 424 of the conduction layer 420. As a result, when the floating electrode substrate 100 is laminated onto the fixed electrode assembly 504, the terminal portion 154 of the conduction layer 150 is connected to the terminal portion 424. The floating electrode substrate 100 shown in FIG. 5 is then laminated onto the fixed electrode assembly 504 described above to form the variable resonator 604.

Figure 20:
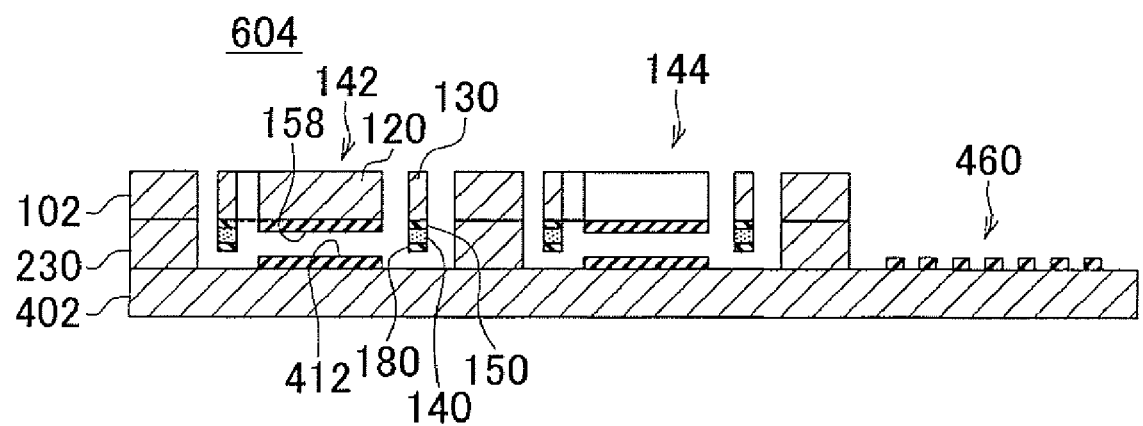
FIG. 20 is a cross-sectional view schematically showing the layered structure of the variable resonator 604.

FIG. 20 is cross-sectional view showing the layered structure of a variable resonator 604 manufactured as described above. The variable resonator 604 is formed by laminating the floating electrode substrate 100 shown in FIG. 5 onto the fixed electrode assembly 504 shown in FIG. 19. Here, the floating electrode substrate 100 is laminated onto the fixed electrode assembly 504 after flipping the floating electrode substrate 100 over the dotted line A2 in FIG. 5 in a direction of the arrow T2. Therefore, the fixed electrode region 412 of the conduction layer 410 on the fixed electrode substrate 400 faces the floating electrode region 158 of the conduction layer 150 on the floating electrode substrate 100.

In the variable resonator 604 having the above structure, a voltage is applied between the conduction layers 150 and 180 to move the floating electrode region 158, so that the space between the floating electrode region 158 and the fixed electrode region 412 changes, thereby changing the capacitance between the floating electrode region 158 and the fixed electrode region 412. The pair of single variable capacitance element regions 142 and 144 are connected to each other in parallel by the connection portion 156 of the conduction layer 150 and the connection portion 414 of the conduction layer 410. Therefore, the combined capacitance of the pair of single variable capacitance element regions 142 and 144 is created between the terminal portion 154 of the conduction layer 150 and the terminal portion 418 of the conduction layer 410.

In the variable resonator 604, the actuator region 130 on the floating electrode substrate 100 side extends to the outside from the outer periphery of the floating electrode region 158, as described above. Accordingly, the space between the conduction layer 150 in the floating electrode region 158 and the conduction layer 410 in the fixed electrode region 412 is almost entirely filled with air. As a result, the floating electrode region 158 can be moved with a large stroke and the single variable capacitance element regions 142 and 144 can be set to have a large capacitance, so that the variable resonator 604 has a large rate of change.

Figure 21:
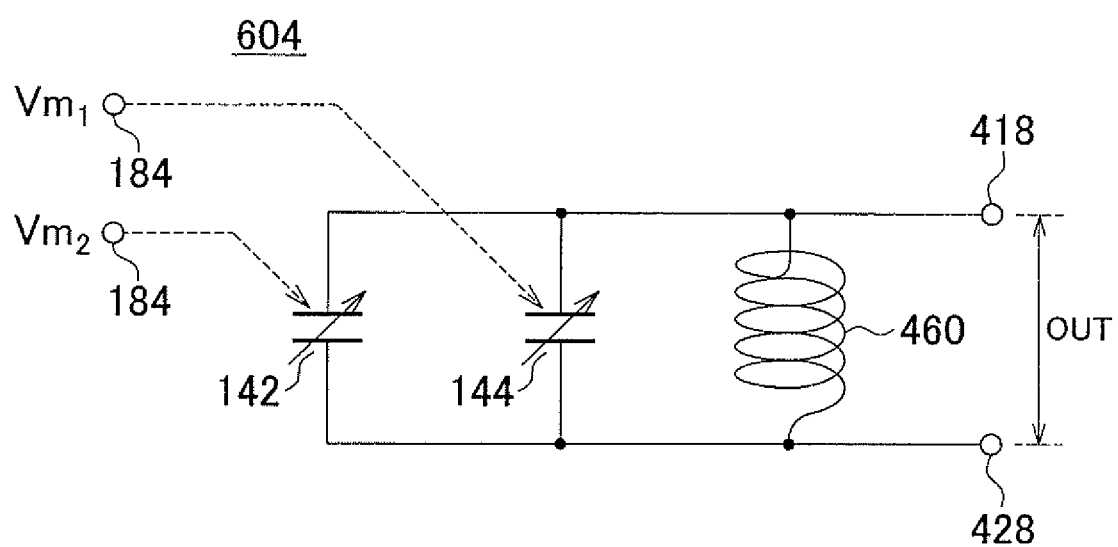
FIG. 21 is a cross-sectional view schematically showing the electrical function of the variable capacitance element 602.

FIG. 21 schematically shows the electrical function of the variable resonator 604. The variable resonator 604 has an electrical structure in which the pair of single variable capacitance element regions 142 and 144 and the inductance element 460 formed by the coil 422 are connected to each other in parallel. Accordingly, this circuit resonates with respect to a specific frequency that is determined by the combined capacitance of the single variable capacitance element regions 142 and 144 and the impedance of the inductance element 460.

Separate drive voltages can be applied to the actuator region 130 in the single variable capacitance element region 142 and the actuator region 130 in the single variable capacitance element region 144, via the terminal portion 184. Accordingly, by applying a drive voltage to the piezoelectric material layer 140 from a floating electrode driving section formed as the voltage source, the floating electrode region 120 can be brought near or moved away from the fixed electrode region 412. In this way, the capacitances of the single variable capacitance element regions 142 and 144 can be individually changed. Therefore, the resonance frequency of the variable resonator 604 can be changed according to the change in the capacitance.

Furthermore, the variable resonator 604 can operate as a CL resonator. In this case, one of the drive voltages $Vm_1$ and $Vm_2$ applied to the single variable capacitance element regions 142 and 144 is selected such that the oscillation frequency becomes the carrier frequency, and the other drive voltage is changed according to a modulation signal. As a result, the variable resonator 604 can function as a frequency modulator having a simple configuration.

Figure 22:
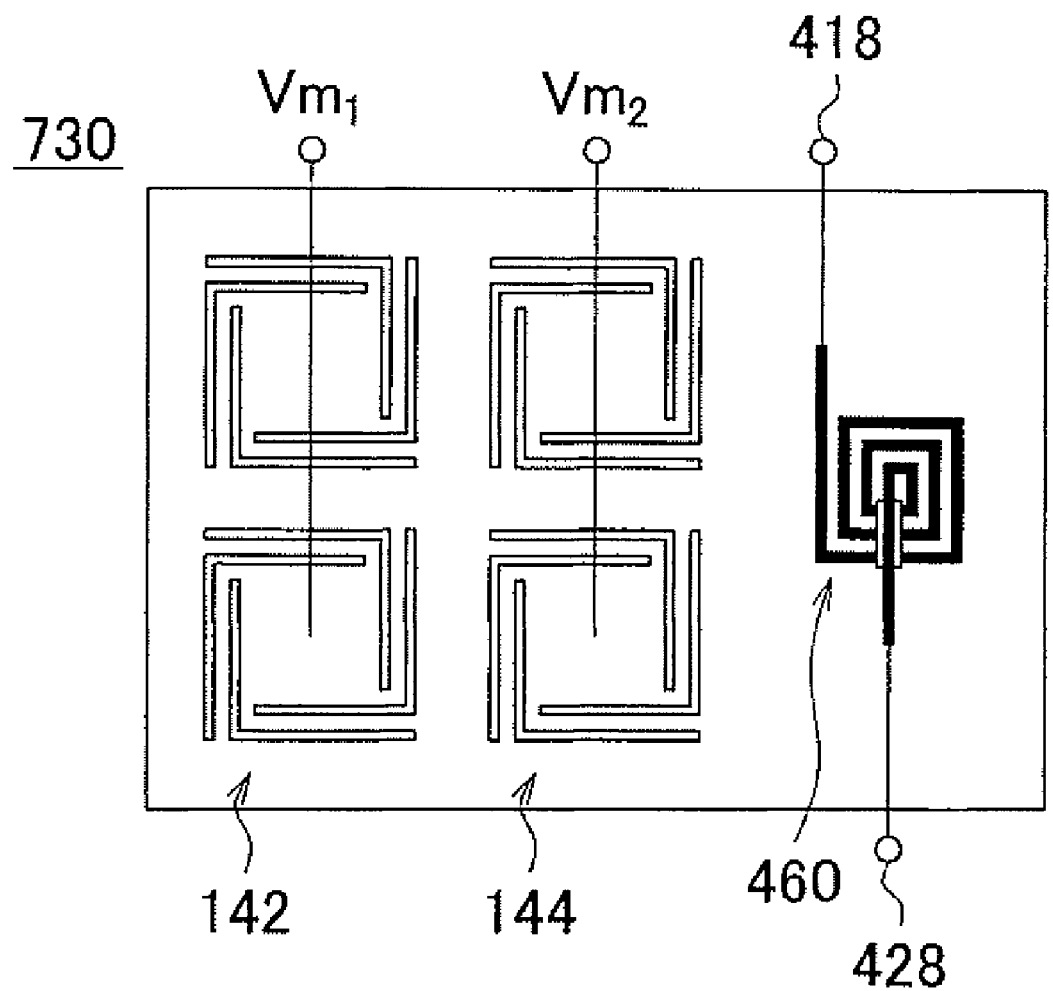
FIG. 22 schematically shows another embodiment of the variable resonator 730.

FIG. 22 schematically shows the structure of a variable resonator 730 according to another embodiment. The variable resonator 730 includes a plurality of single variable capacitance elements 141. The two drive voltages $Vm_1$ and $Vm_2$, one of which is the drive voltage applied to determine the carrier frequency and the other of which is the drive voltage applied to determine the modulation frequency, are applied to the single variable capacitance elements 141. As a result, both frequencies can be determined using a large capacitance and a large rate of change. Furthermore, since each single variable capacitance element 141 includes an independent actuator region 130, the response speed for a change in the drive voltage determining the modulation frequency is particularly high.

Figure 23:
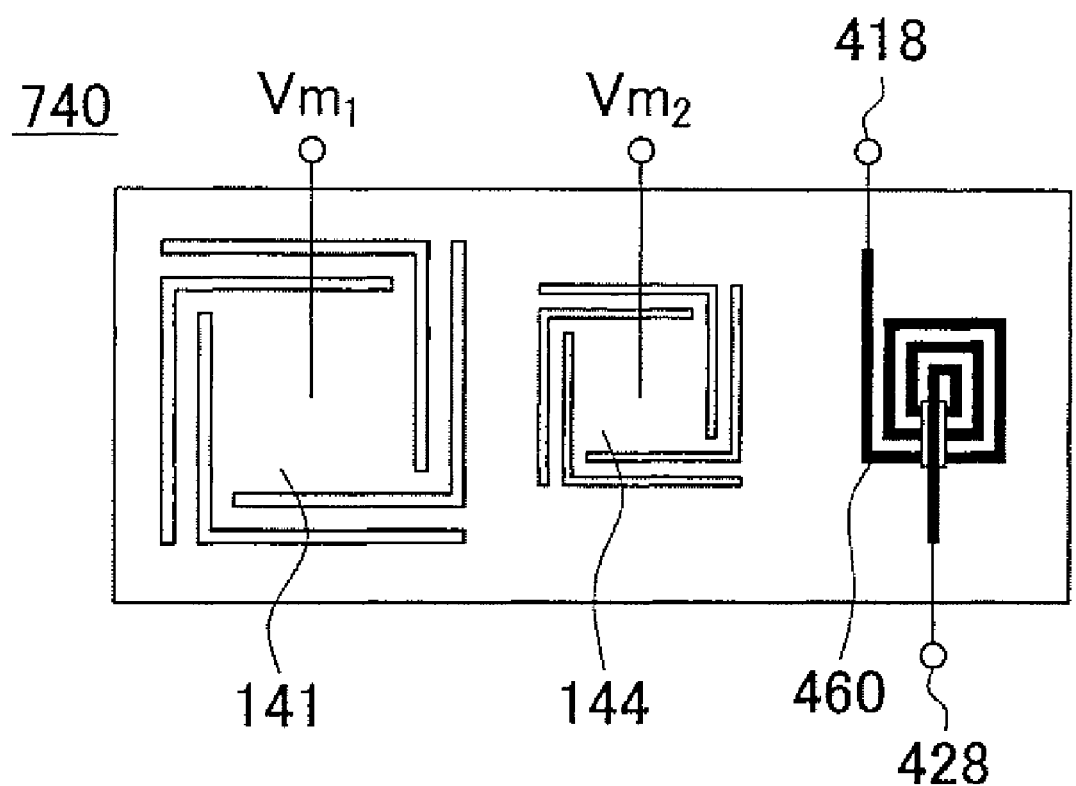
FIG. 23 schematically shows another embodiment of the variable resonator 740.

FIG. 23 schematically shows another embodiment of the variable resonator 740. The variable resonator 740 includes a combination of a single variable capacitance element 148 and a large single variable capacitance element 146 having greater dimensions than the single variable capacitance element 148. Therefore, by using the large single variable capacitance element 146 to determine the carrier frequency and the single variable capacitance element 148 to determine the modulation frequency, for example, the resulting frequency modulator has a high response speed.

As described above, the variable capacitance element, and the variable resonator and modulator using this variable capacitance element, can be formed of a thin metal film having low conduction loss to obtain a high Q value and low conduction loss. By providing a plurality of single variable capacitance elements that can be changed simultaneously or individually, the response speed does not drop even when the capacitance increases. Furthermore, using photolithography for the manufacturing enables industrial mass production with high precision and yield. Yet further, the variable capacitance elements can be integrated with other circuit elements. Accordingly, these variable capacitance elements can be used is many electrical circuits, such as variable frequency oscillators (VFOs), tuned amplifiers, phase shifters, impedance matching circuits, and the like.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A variable capacitance element comprising:
   a plurality of single capacitance elements that each include (i) a fixed electrode provided on a surface of a substrate, (ii) a floating electrode provided to be separate from the fixed electrode and facing the fixed electrode, and (iii) an actuator that moves the floating electrode closer to or farther from the fixed electrode; and
   a floating electrode driving section that supplies the actuators with drive power to move the floating electrodes, such that a combined capacitance of the plurality of single capacitance elements becomes a prescribed capacitance;
   wherein
   each actuator is affixed to an outer surface of an outer periphery of the corresponding floating electrode, and the actuator extends substantially on the same plane as the floating electrode extends.

2. The variable capacitance element according to claim 1, wherein
   the floating electrode driving section supplies the drive power to simultaneously move actuators provided to two or more of the plurality of single capacitance elements.

3. The variable capacitance element according to claim 1, wherein
   the floating electrode of at least one of the plurality of single capacitance elements has a different area than the floating electrode of another of the single capacitance elements.

4. The variable capacitance element according to claim 1, wherein
   the fixed electrodes of two or more of the single capacitance elements are formed in a single common conduction layer.

5. The variable capacitance element according to claim 1, wherein
   each fixed electrode includes a dielectric layer formed on a surface thereof facing the corresponding floating electrode.

6. The variable capacitance element according to claim 1, wherein
   in each single capacitance element, at least one of the floating electrode and the actuator includes a conduction layer formed on a surface of a silicon wafer.

7. The variable capacitance element according to claim 1, wherein
   each single capacitance element includes a plurality of actuators connected to a center of the floating electrode at uniform intervals.

8. The variable capacitance element according to claim 1, wherein
   each actuator includes a piezoelectric material layer that stretches and contracts according to the drive power supplied by the floating electrode driving section.

9. The variable capacitance element according to claim 8, wherein
   each actuator includes a support layer that has one end fixed to the substrate and another end connected to the corresponding floating electrode, and that provides support across the entire surface of the piezoelectric material layer, and
   the support layer bends in response to the stretching and contracting of the piezoelectric material layer to move the floating electrode.

10. A resonator comprising:
    the variable capacitance element according to claim 1;
    an inductance element that is electrically connected to the variable capacitance element to form a resonant circuit; and
    a resonance control section that controls the floating electrode driving section such that the combined capacitance of the plurality of single capacitance elements becomes a capacitance that causes the resonant circuit to resonate at a desired resonance frequency.

11. The resonator according to claim 10, wherein
    the fixed electrodes and the inductance element include a conduction layer formed on a surface of a common silicon wafer.

12. A modulator comprising:
    the variable capacitance element according to claim 1;
    an inductance element that is electrically connected to the capacitance element to form an oscillation circuit;

a carrier wave control section that controls the floating electrode driving section such that at least one of the plurality of single capacitance elements has a capacitance that causes the oscillation circuit to oscillate at a desired carrier wave frequency; and a modulation control section that controls the floating electrode driving section such that a different at least one of the plurality of single capacitance elements has a capacitance that changes an oscillation frequency of the oscillation circuit in accordance with a modulation signal supplied from an external source.

13. The modulator according to claim 12, wherein the floating electrode of the single capacitance element operating under the control of the modulation control section has an area that is less than an area of the floating electrode of the single capacitance element operating under the control of the carrier wave control section.

14. A variable capacitance element comprising:
a plurality of single capacitance elements that each include (i) a fixed electrode provided on a surface of a substrate, (ii) a floating electrode provided to be separate from the fixed electrode and facing the fixed electrode, and (iii) an actuator that includes a piezoelectric material and moves the floating electrode closer to or farther from the fixed electrode; and
a floating electrode driving section that supplies the piezoelectric material of the actuator with drive power to move the floating electrodes, such that a combined capacitance of the plurality of single capacitance elements becomes a prescribed capacitance.

15. A variable capacitance element comprising:
a first substrate;
a fixed electrode provided on the first substrate;
a second substrate;
a floating electrode provided on the second substrate, the floating electrode being separate from and facing the fixed electrode;
a plurality of single capacitance elements comprising (i) the fixed electrode, (ii) the floating electrode, and (iii) an actuator that is provided on the second substrate and moves the floating electrode closer to or farther from the fixed electrode; and
a floating electrode driving section that supplies the actuators with drive power to move the floating electrodes, such that a combined capacitance of the plurality of single capacitance elements becomes a prescribed capacitance;
wherein
each actuator includes a support having one end fixed to the second substrate and the other end connecting to the floating electrode, and the length of the support is longer than the distance between the floating electrode and the second substrate.

16. The modulator according to claim 15, wherein
the floating electrode has a square shape having a first side and a second side defining a corner with the first side; and
the support has a first elongated part and a second elongated part one end of which connecting to the first elongated part, and the other end of the second elongated part connecting to the second substrate, the other end of the first elongated part connecting to the corner of the floating electrode and elongating along the first side of the floating electrode, the second elongated part elongating along the second side of the floating electrode.

17. A method for manufacturing a variable capacitance element including a plurality of single capacitance elements that each include (i) a first substrate, (ii) a fixed electrode provided on the first substrate, (iii) a second substrate, (iv) a floating electrode provided on the second substrate, the floating electrode being separate from and facing the fixed electrode, (v) a plurality of single capacitance elements comprising (a) the fixed electrode, (b) the floating electrode, and (c) an actuator that is provided on the second substrate and moves the floating electrode closer to or farther from the fixed electrode; and (vi) a floating electrode driving section that supplies the actuators with drive power to move the floating electrodes, such that a combined capacitance of the plurality of single capacitance elements becomes a prescribed capacitance, (vii) each actuator including a support having one end fixed to the second substrate and the other end connecting to the floating electrode, comprising:
preparing a semiconductor substrate serving as the second substrate; and
forming four L-shaped hole patterns on the second substrate whereby the hole patterns surround the floating electrode such that the floating electrode being square shaped, and whereby
the floating electrode has a square shape having a first side and a second side defining a corner with the first side; and
the support has a first elongated part and a second elongated part one end of which connecting to the first elongated part, and the other end of the second elongated part connecting to the second substrate, the other end of the first elongated part connecting to the corner of the floating electrode and elongating along the first side of the floating electrode, the second elongated part elongating along the second side of the floating electrode.

* * * * *